(12) United States Patent
Kashyap et al.

(10) Patent No.: US 12,556,657 B2
(45) Date of Patent: Feb. 17, 2026

(54) CONTENT GENERATION SERVICE FROM VIDEO CONFERENCE CONTENT FOR A CONTENT COLLABORATION PLATFORM

(71) Applicant: Atlassian Pty Ltd., Sydney (AU)

(72) Inventors: Anand Kashyap, San Jose, CA (US); Dylan Soechting, Austin, TX (US); Alexander Garza, Frisco, TX (US)

(73) Assignee: ATLASSIAN PTY LTD., Sydney (AU)

( * ) Notice: Subject to any disclaimer, the term of this patent is extended or adjusted under 35 U.S.C. 154(b) by 230 days.

(21) Appl. No.: 18/399,491

(22) Filed: Dec. 28, 2023

(65) Prior Publication Data

US 2025/0220140 A1 Jul. 3, 2025

(51) Int. Cl.
*H04N 7/15* (2006.01)
*G10L 15/26* (2006.01)
*H04L 65/403* (2022.01)
*H04N 7/14* (2006.01)

(52) U.S. Cl.
CPC .............. *H04N 7/155* (2013.01); *G10L 15/26* (2013.01); *H04L 65/403* (2013.01); *H04N 7/14* (2013.01); *H04N 7/152* (2013.01)

(58) Field of Classification Search
None
See application file for complete search history.

(56) References Cited

U.S. PATENT DOCUMENTS

| | | | | |
|---|---|---|---|---|
| 11,315,569 | B1 * | 4/2022 | Talieh | H04L 12/1831 |
| 2014/0278377 | A1 * | 9/2014 | Peters | G06F 16/345 |
| | | | | 704/235 |
| 2017/0060917 | A1 * | 3/2017 | Marsh | H04L 65/1069 |
| 2022/0277733 | A1 * | 9/2022 | Totzke | H04L 12/1831 |
| 2023/0394854 | A1 * | 12/2023 | Polavaram | G06V 20/41 |
| 2024/0176960 | A1 * | 5/2024 | Maurer | G06F 16/345 |
| 2025/0063140 | A1 * | 2/2025 | Grillo | G06F 40/30 |
| 2025/0140246 | A1 * | 5/2025 | Lee | H04L 65/1089 |

* cited by examiner

*Primary Examiner* — Quoc D Tran
(74) *Attorney, Agent, or Firm* — Brownstein Hyatt Farber Schreck, LLP

(57) ABSTRACT

Embodiments described herein relate to systems and methods for collaboration content creation from video conferencing content. In one or more examples, a content collaboration system may receive a notification from a video conferencing platform that a video conference session has ended. The system then receives a transcript of the video conference session. From the transcript, the system generates a transcript-processing prompt to provide to a generative output engine, which returns a generative response including a natural language string that is based on the transcript, prompt, and an output format indicated by the prompt. The system then creates a new collaboration content object, or modifies an existing object, using at least a portion of the generative response.

20 Claims, 13 Drawing Sheets

500 →

CREATE ISSUE  [IMPORT ISSUES] [CONFIGURE FIELDS ˅]

PROJECT*
502 — [PROJECT NAME ˅]

ISSUE TYPE*
504 — [☑ TASK ˅] (?)
SOME ISSUE TYPES ARE UNAVAILABLE DUE TO INCOMPATIBLE FIELD CONFIGURATION AND/OR WORKFLOW ASSOCIATIONS.

SUMMARY*
506 — [{{meeting.title}} {{body.meetingDate}}]

REPORTER*
508 — [(R) JANE DOE ˅]
START TYPING TO GET A LIST OF POSSIBLE MATCHES.

COMPONENT(S)
510 — [NONE]

DESCRIPTION
[STYLE ˅ | B I ... ▤˅ ▦ ▤ ☑ ⌘ ▨ @ ☺ ⊞ ▦ | ˅]
512 — ACTION ITEMS:     Lorem ipsum dolor sit amet @USERNAME1 ⁓ 252
                     Lorem ipsum dolor sit amet @USERNAME2 ⁓ 254

FIX VERSION(S)
[ ˅]
START TYPING TO GET A LIST OF POSSIBLE MATCHES OR PRESS DOWN TO SELECT.

PRIORITY
514 — [↑ NORMAL ˅] (?)

LABELS
516 — [ ˅]
BEGIN TYPING TO FIND AND CREATE LABELS OR PRESS DOWN TO SELECT A SUGGESTED LABEL.

AFFECTS VERSION(S)
[ ˅]
START TYPING TO GET A LIST OF POSSIBLE MATCHES OR PRESS DOWN TO SELECT.

LINKED ISSUES
518 — [RELATES TO ˅]

ISSUE
520 — [ ˅]
BEGIN TYPING TO SEARCH FOR ISSUES TO LINK. IF YOU LEAVE BLANK, NO LINK WILL BE MADE.

ASSIGNEE
522 — [(R) AUTOMATIC ˅]
ASSIGN TO ME

EPIC LINK           524    524
[ ˅]
CHOOSE AN EPIC TO ASSIGN THIS ISSUE TO
☐ CREATE ANOTHER   [CREATE] [CANCEL]

*FIG. 5*

CONTENT GENERATION SERVICE FROM VIDEO CONFERENCE CONTENT FOR A CONTENT COLLABORATION PLATFORM

TECHNICAL FIELD

Embodiments described herein relate to a content generation service for video conference content for collaborative work environments and, in particular, to systems and methods for collaboration content creation from video conferencing content.

BACKGROUND

An organization can establish a collaborative work environment by self-hosting, or providing its employees with access to, a suite of discrete software platforms or services to facilitate cooperation and completion of work. In many cases, the organization may also define policies outlining best practices for interacting with, and organizing data within, each software platform of the suite of software platforms.

Often internal best practice policies require employees to thoroughly document completion of tasks, assignment of work, decision points, and so on. Such policies additionally often require employees to structure and format documentation in particulars ways, to copy data or status information between multiple platforms at specific times, or to perform other rigidly defined, policy-driven, tasks. These requirements are both time and resource consuming for employees, reducing overall team and individual productivity.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 5 depicts a user interface of an issue tracking platform, in accordance with aspects described herein.

The use of the same or similar reference numerals in different figures indicates similar, related, or identical items.

Figure 1:
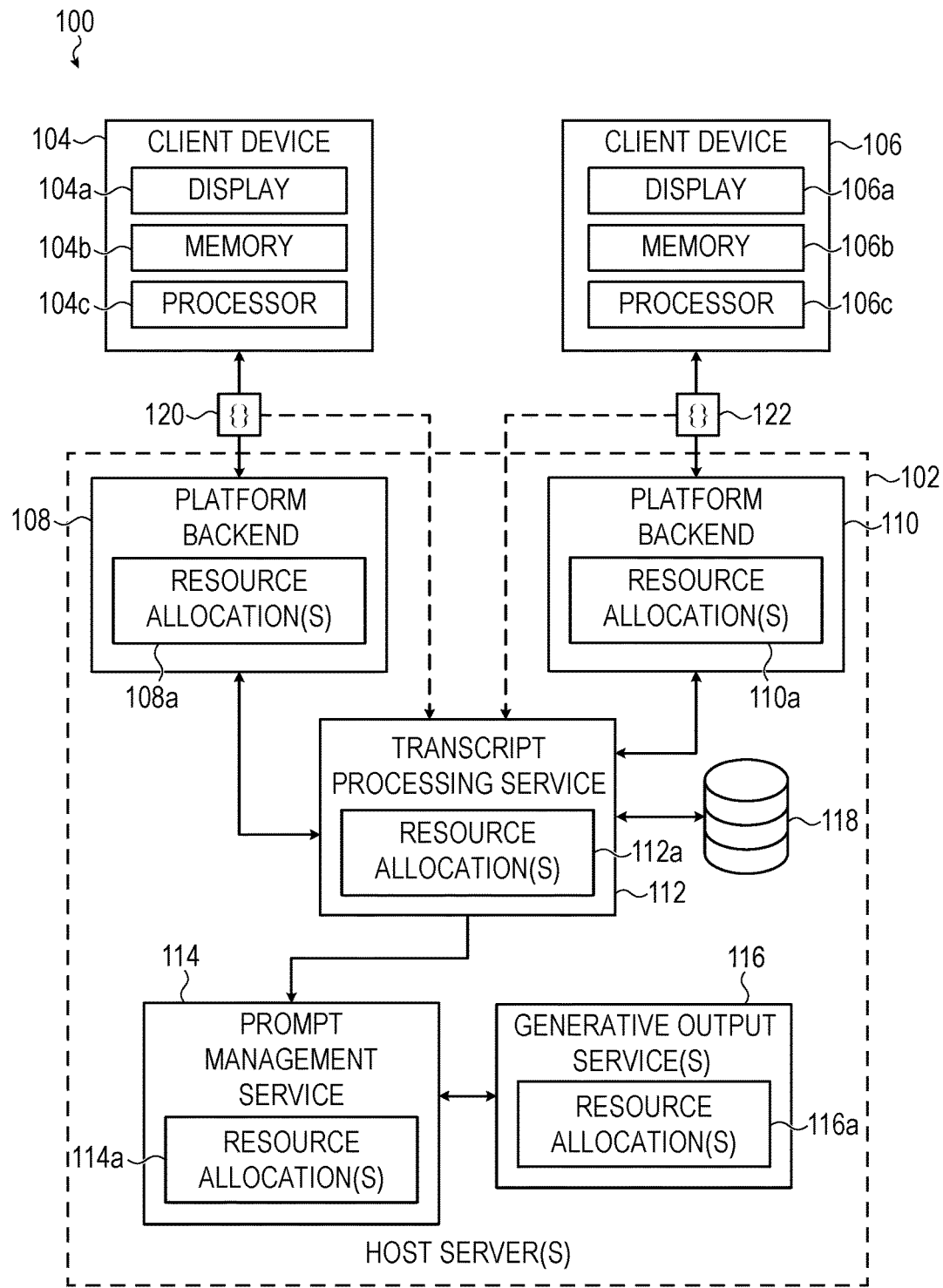
FIG. 1 depicts a simplified diagram of a system, such as described herein that can include and/or may receive input from a generative output engine.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems, devices, and methods for a content generation service for video conference content for collaborative work environments, such as documentation systems, issue tracking systems, project management platforms, and the like.

Collaboration platforms can be used to generate, store, and organize user-generated content. As described herein, a collaboration platform or service may include an editor that is configured to receive user input and generate user-generated content that is saved as a content item. The terms "collaboration platform" or "collaboration service" may be used to refer to a documentation platform or service configured to manage electronic documents or pages created by the system users, an issue tracking platform or service that is configured to manage or track issues or tickets in accordance with an issue or ticket workflow, a source-code management platform or service that is configured to manage source code and other aspects of a software product, a manufacturing resource planning platform or service configured to manage inventory, purchases, sales activity or other aspects of a company or enterprise. The examples provided herein are described with respect to an editor that is integrated with the collaboration platform. In some instances, the functionality described herein may be adapted to multiple platforms or adapted for cross-platform use through the use of a common or unitary editor service. For example, the functionality described in each example is provided with respect to a particular collaboration platform, but the same or similar functionality can be extended to other platforms by using the same editor service. Also, as described above a set of host services or platforms may be accessed through a common gateway or using a common authentication scheme, which may allow a user to transition between platforms and access platform-specific content without having to enter user credentials for each platform.

An automation rule (which may also be referred to as "automated rules," or simply "rules") is an automated workflow that is generally constructed in a "if this, then that"

format. Typically, for example a collaboration platform, an automation rule results in the performance of an action upon the occurrence of a trigger, if certain conditions are met. In a collaboration platform, each rule automation rule is made by combining different types of components, including triggers and actions. An automation rule typically also includes a condition. Branches may also be used in some cases. As used herein, automation rules begin with a trigger (which may also be referred to as a trigger component), the trigger being the catalyst that sets the execution of a rule in motion. In one or more embodiments, a condition (which may also be referred to as a condition component) may also be used, where the condition is a limit on the scope of the automation rule. For example, a condition may require that the rule may only be run when the action that initiated the trigger was performed by a certain user or group of users. As used herein, an action (or action component) is what the rule to does or performs, for example what happens when the trigger (and conditions if applicable) are met. In some embodiments, an automation rule may also include a branch. A branch expands the performance or execution of a rule by adding a secondary path (a branch). As used herein, a branch is a sequence of conditions and/or actions that run in isolation from the rest of the rule, but are applied to each (e.g., every) instance of an object. For example, the rule for each task (e.g., an object) can be branched so that a message is sent to a recipient every time a person is mentioned on a particular page (e.g., when such page is published). This branch action occurs in addition to any action on the primary path of the automation rule chain. Automation rules allow for a powerful way to automate their workflow.

Recently, companies and individuals have become increasingly reliant on remote work. Video conferencing platforms have proliferated and facilitated an increase in remote interactions that use and rely on the platforms. Remote (e.g., virtual) meetings using video conferencing platforms have increasingly replaced in-person meetings. In many instances, these meetings may be recorded, producing video, audio, and metadata that may be made available to the user for later reference. Additionally, tools that provide a written transcript of a meeting on a video conferencing platforms are increasingly available. Such transcript tools may be provided by the video conferencing platform itself, or provided by a third-party that analyzes the video and/or audio data from the meeting to generate a transcript. In some cases, the transcript tools process the video and/or audio data after the meeting has ended, but the transcript tools may also operate in parallel with the recording of the meeting itself (e.g., in a "live" mode of operation).

Some time after the meeting, a user (e.g., participant to the meeting or another interested party) may access the audio or video recordings, or the generated transcript, to review the meeting and gain information relevant to that user. However, watching a video recording, listening to an audio recording, and reading a transcript are all time-consuming activities, and may be inefficient. In many cases, the meeting may inefficiently cover the relevant agenda items. For example, only a small portion of a meeting may be relevant to the reviewing user. As another example, many different topics may have been discussed and finding the relevant portion of the meeting may be challenging. In some cases, a meeting may have been long with much discussion and debate, with the most relevant portions, such as a conclusion or set of action items, only discussed during a small part of the meeting. Moreover, it may be unclear which recorded meeting relate to what topics, teams, or individuals, and a meeting title may be insufficiently specific, or the title omitted. Even where notes are manually taken during a meeting by a participant, the notes may be incomplete, personal to the notetaker, and a distraction and burden for the notetaker who would otherwise be a more active participant or perform other tasks. For myriad reasons, improved processing of a meeting transcript (or other meeting recording outputs) to extract and generate collaboration content for a content collaboration system is desired.

As further described herein, collaboration content creation from video conferencing content utilizing a generative output engine are described. In one or more embodiments, as further described herein, a content collaboration system receives a notification from a video conferencing platform that a video conference session has ended. The video conference session may be of a video conferencing platform of the system, or a third-party video conferencing platform. The system then receives a transcript of the video conference session. Based on the transcript, the system generates a transcript-processing prompt to provide to a generative output engine, which returns a generative response including a natural language string that is based on the transcript, prompt, and an output format indicated by the prompt. The system then creates a new collaboration content object, or modifies an existing object, using at least a portion of the generative response.

FIG. 1 depicts a simplified diagram of a system, such as described herein that can include and/or may receive input from a generative output engine as described herein. The system 100 is depicted as implemented in a client-server architecture, but it may be appreciated that this is merely one example and that other communications architectures are possible.

In particular the system 100 includes a set of host servers 102 which may be one or more virtual or physical computing resources (collectively referred in many cases as a "cloud platform"). In some cases, the set of host servers 102 can be physically collocated or in other cases, each may be positioned in a geographically unique location.

The set of host servers 102 can be communicably coupled to one or more client devices; two example devices are shown as the client device 104 and the client device 106. The client devices 104, 106 can be implemented as any suitable electronic device. In many embodiments, the client devices 104, 106 are personal computing devices such as desktop computers, laptop computers, or mobile phones.

The set of host servers 102 can be supporting infrastructure for one or more backend applications, each of which may be associated with a particular software platform, such as a documentation platform or an issue tracking platform. Other examples information technology system management (ITSM) systems, chat platforms, messaging platforms, and the like. These backends can be communicably coupled to a generative output engine that can be leveraged to provide unique intelligent functionality to each respective backend. For example, the generative output engine can be configured to receive user prompts, such as described above, to modify, create, or otherwise perform operations against content stored by each respective software platform.

By centralizing access to the generative output engine in this manner, the generative output platform can also serve as an integration between multiple platforms. For example, one platform may be a documentation platform and the other platform may be an issue tracking system. In these examples, a user of the documentation platform may input a prompt requesting a summary of the status of a particular project documented in a particular page of the documentation platform. A comprehensive continuation/response to this summary request may pull data or information from the issue tracking system as well.

A user of the client devices may trigger production of generative output in a number of suitable ways. One example is shown in FIG. 1. In particular, in this embodiment, each of the software platforms can share a common feature, such as a common centralized editor rendered in a frame of the frontend user interfaces of both platforms.

Turning to FIG. 1, a portion of the set of host servers 102 can be allocated as physical infrastructure supporting a first platform backend 108 and a different portion of the set of host servers 102 can be allocated as physical infrastructure supporting a second platform backend 110.

The two different platforms maybe instantiated over physical resources provided by the set of host servers 102. Once instantiated, the first platform backend 108 and the second platform backend 110 can each communicably couple to a transcript processing service 112 (also referred to as a centralized transcript processing service, or more simply as an "editor" or an "editor service").

The transcript processing service 112 can be configured to cause rendering of a frame within respective frontends of each of the first platform backend 108 and the second platform backend 110. In this manner, and as a result of this construction, each of the first platform and the second platform present a consistent user content editing experience.

More specifically, the transcript processing service 112 may be a rich text editor with added functionality (e.g., slash command interpretation, in-line images and media, and so on). As a result of this centralized architecture, multiple platforms in a multiplatform environment can leverage the features of the same rich text editor. This provides a consistent experience to users while dramatically simplifying processes of adding features to the editor.

For example, in one embodiment, a user in a multiplatform environment may use and operate a documentation platform and an issue tracking platform. In this example, both the issue tracking platform and the documentation platform may be associated with a respective frontend and a respective backend. Each platform may be additionally communicably and/or operably coupled to a transcript processing service 112 that can be called by each respective frontend whenever it is required to present the user of that respective frontend with an interface to edit text.

For example, the documentation platform's frontend may call upon the transcript processing service 112 to render, or assist with rendering, a user input interface element to receive user text input when a user of the documentation platform requests to being editing a document stored by the documentation platform backend.

Similarly, the issue tracking platform's frontend may call upon the transcript processing service 112 to render, or assist with rendering, a user input interface element to receive user text input when a user of the documentation platform opens a new issue (also referred to as a ticket), and begins typing an issue description.

In these examples, the transcript processing service 112 can parse text input provided by users of the documentation platform frontend and/or the issue tracking platform backend, monitoring for command and control keywords, phrases, trigger characters, and so on. In many cases, for example, the transcript processing service 112 can implement a slash command service that can be used by a user of either platform frontend to issue commands to the backend of the other system.

For example, the user of the documentation platform frontend can input a slash command to the content editing frame, rendered in the documentation platform frontend supported by the transcript processing service 112, in order to type a prompt including an instruction to create a new issue or a set of new issues in the issue tracking platform. Similarly, the user of the issue tracking platform can leverage slash command syntax, enabled by the transcript processing service 112, to create a prompt that includes an instruction to edit, create, or delete a document stored by the documentation platform.

As described herein, a "content editing frame" references a user interface element that can be leveraged by a user to draft and/or modify rich content including, but not limited to: formatted text; image editing; data tabling and charting; file viewing; and so on. These examples are not exhaustive; the content editing elements can include and/or may be implemented to include many features, which may vary from embodiment to embodiment. For simplicity of description the embodiments that follow reference a transcript processing service 112 configured for rich text editing, but it may be appreciated that this is merely one example.

As a result of architectures described herein, developers of software platforms that would otherwise dedicate resources to developing, maintaining, and supporting content editing features can dedicate more resources to developing other platform-differentiating features, without needing to allocate resources to development of software components that are already implemented in other platforms.

In addition, as a result of the architectures described herein, services supporting the transcript processing service 112 can be extended to include additional features and functionality—such as a slash command and control feature—which, in turn, can automatically be leveraged by any further platform that incorporates a content editing frame, and/or otherwise integrates with the transcript processing service 112 itself. In this example, slash commands facilitated by the editor service can be used to receive prompt instructions from users of either frontend. These prompts can be provided as input to a prompt engineering/prompt preconditioning service (such as the prompt management service 114) that, in turn, provides a modified user prompt as input to a generative output service 116.

The generative output engine service may be hosted over the host servers 102 or, in other cases, may be a software instance instantiated over separate hardware. In some cases, the generative engine service may be a third party service that serves an API interface to which one or more of the host services and/or preconditioning service can communicably couple.

The generative output engine can be configured as described above to provide any suitable output, in any suitable form or format. Examples include content to be added to user-generated content, API request bodies, replacing user-generated content, and so on.

In addition, a transcript processing service 112 can be configured to provide suggested prompts to a user as the user types. For example, as a user begins typing a slash command in a frontend of some platform that has integrated with a transcript processing service 112 as described herein, the transcript processing service 112 can monitor the user's typing to provide one or more suggestions of prompts, commands, or controls (herein, simply "preconfigured prompts") that may be useful to the particular user providing the text input. The suggested preconfigured prompts may be retrieved from a database 118. In some cases, each of the preconfigured prompts can include fields that can be replaced with user-specific content, whether generated in respect of the user's input or generated in respect of the user's identity and session.

In some embodiments, the transcript processing service 112 can be configured to suggest one or more prompts that can be provided as input to a generative output engine as described herein to perform a useful task, such creating or modifying collaboration content objects based on processing transcripts from video conferencing sessions.

The ordering of the suggestion list and/or the content of the suggestion list may vary from user to user, user role to user role, and embodiment to embodiment. For example, when interacting with a documentation system, a user having a role of "developer" may be presented with prompts associated with tasks related to an issue tracking system and/or a code repository system.

Alternatively, when interacting with the same documentation system, a user having a role of "human resources professional" may be presented with prompts associated with manipulating or summarizing information presented in a directory system or a benefits system, instead of the issue tracking system or the code repository system.

More generally, in some embodiments described herein, a transcript processing service 112 can be configured to suggest to a user one or more prompts that can cause a generative output engine to provide useful output and/or perform a useful task for the user. These suggestions/prompts can be based on the user's role, a user interaction history by the same user, user interaction history of the user's colleagues, or any other suitable filtering/selection criteria.

In addition to the foregoing, a transcript processing service 112 as described herein can be configured to suggest discrete commands that can be performed by one or more platforms. As with preceding examples, the ordering of the suggestion list and/or the content of the suggestion list may vary from embodiment to embodiment and user to user. For example, the commands and/or command types presented to the user may vary based on that user's history, the user's role, and so on.

More generally and broadly, the embodiments described herein reference systems and methods for sharing user interface elements rendered by a transcript processing service 112 and features thereof (such as a slash command processor), between different software platforms in an authenticated and secure manner. For simplicity of description, the embodiments that follow reference a configuration in which a transcript processing service is configured to implement a slash command feature—including slash command suggestions—but it may be appreciated that this is merely one example and other configurations and constructions are possible.

More specifically, the first platform backend 108 can be configured to communicably couple to a first platform frontend instantiated by cooperation of a memory and a processor of the client device 104. Once instantiated, the first platform frontend can be configured to leverage a display of the client device 104 to render a graphical user interface so as to present information to a user of the client device 104 and so as to collect information from a user of the client device 104. Collectively, the processor, memory, and display of the client device 104 are identified in FIG. 1 as the client devices resources 104a-104c, respectively.

As with many embodiments described herein, the first platform frontend can be configured to communicate with the first platform backend 108 and/or the transcript processing service 112. Information can be transacted by and between the frontend, the first platform backend 108 and the transcript processing service 112 in any suitable manner or form or format. In many embodiments, as noted above, the client device 104 and in particular the first platform frontend can be configured to send an authentication token 120 along with each request transmitted to any of the first platform backend 108 or the transcript processing service 112 or the preconditioning service or the generative output engine.

Similarly, the second platform backend 110 can be configured to communicably couple to a second platform frontend instantiated by cooperation of a memory and a processor of the client device 106. Once instantiated, the second platform frontend can be configured to leverage a display of the client device 106 to render a graphical user interface so as to present information to a user of the client device 106 and so as to collect information from a user of the client device 106. Collectively, the processor, memory, and display of the client device 106 are identified in FIG. 1 as the client devices resources 106a-106c, respectively.

As with many embodiments described herein, the second platform frontend can be configured to communicate with the second platform backend 110 and/or the transcript processing service 112. Information can be transacted by and between the frontend, the second platform backend 110 and the transcript processing service 112 in any suitable manner or form or format. In many embodiments, as noted above, the client device 106 and in particular the second platform frontend can be configured to send an authentication token 122 along with each request transmitted to any of the second platform backend 110 or the transcript processing service 112.

As a result of these constructions, the transcript processing service 112 can provide uniform feature sets to users of either the client device 104 or the client device 106. For example, the transcript processing service 112 can implement a slash command processor to receive prompt input and/or preconfigured prompt selection provided by a user of the client device 104 to the first platform and/or to receive input provided by a different user of the client device 106 to the second platform.

As noted above, the transcript processing service 112 ensures that common features, such as slash command handling, are available to frontends of different platforms. One such class of features provided by the transcript processing service 112 invokes output of a generative output engine of a service such as the generative output service 116.

For example, as noted above, the generative output service 116 can be used to generate content, supplement content, and/or generate API requests or API request bodies that cause one or both of the first platform backend 108 or the second platform backend 110 to perform a task. In some cases, an API request generated at least in part by the generative output service 116 can be directed to another system not depicted in FIG. 1. For example, the API request can be directed to a third-party service (e.g., referencing a callback, as one example, to either backend platform) or an integration software instance. The integration may facilitate data exchange between the second platform backend 110 and the first platform backend 108 or may be configured for another purpose.

As with other embodiments described herein, the prompt management service 114 can be configured to receive user input (provided via a graphical user interface of the client device 104 or the client device 106) from the transcript processing service 112. The user input may include a prompt to be continued by the generative output service 116.

The prompt management service 114 can be configured to modify the user input, to supplement the user input, select a prompt from a database (e.g., the database 118) based on the user input, insert the user input into a template prompt, replace words within the user input, preform searches of databases (such as user graphs, team graphs, and so on) of either the first platform backend 108 or the second platform backend 110, change grammar or spelling of the user input, change a language of the user input, and so on. The prompt management service 114 may also be referred to herein as herein as an "editor assistant service" or a "prompt constructor." In some cases, the prompt management service 114 is also referred to as a "content creation and modification service."

Output of the prompt management service 114 can be referred to as a modified prompt or a preconditioned prompt. This modified prompt can be provided to the generative output service 116 as an input. More particularly, the prompt management service 114 is configured to structure an API request to the generative output service 116. The API request can include the modified prompt as an attribute of a structured data object that serves as a body of the API request. Other attributes of the body of the API request can include, but are not limited to: an identifier of a particular LLM or generative engine to receive and continue the modified prompt; a user authentication token; a tenant authentication token; an API authorization token; a priority level at which the generative output service 116 should process the request; an output format or encryption identifier; and so on. One example of such an API request is a POST request to a Restful API endpoint served by the generative output service 116. In other cases, the prompt management service 114 may transmit data and/or communicate data to the generative output service 116 in another manner (e.g., referencing a text file at a shared file location, the text file including a prompt, referencing a prompt identifier, referencing a callback that can serve a prompt to the generative output service 116, initiating a stream comprising a prompt, referencing an index in a queue including multiple prompts, and so on; many configurations are possible).

In response to receiving a modified prompt as input, the generative output service 116 can execute an instance of a generative output engine, such as an LLM. As noted above, in some cases, the prompt management service 114 can be configured to specify what engine, engine version, language, language model or other data should be used to continue a particular modified prompt.

The selected LLM or other generative engine continues the input prompt and returns that continuation to the caller, which in many cases may be the prompt management service 114. In other cases, output of the generative output service 116 can be provided to the transcript processing service 112 to return to a suitable backend application, to in turn return to or perform a task for the benefit of a client device such as the client device 104 or the client device 106. More particularly, it may be appreciate that although FIG. 1 is illustrated with only the prompt management service 114 communicably coupled to the generative output service 116, this is merely one example and that in other cases the generative output service 116 can be communicably coupled to any of the client device 106, the client device 104, the first platform backend 108, the second platform backend 110, the transcript processing service 112, or the prompt management service 114.

In some cases, output of the generative output service 116 can be provided to an output processor or gateway configured to route the response to an appropriate destination. For example, in an embodiment, output of the generative engine may be intended to be prepended to an existing document of a documentation system. In this example, it may be appropriate for the output processor to direct the output of the generative output service 116 to the frontend (e.g., rendered on the client device 104, as one example) so that a user of the client device 104 can approve the content before it is prepended to the document. In another example, output of the generative output service 116 can be inserted into an API request directly to a backend associated with the documentation system. The API request can cause the backend of the documentation system to update an internal object representing the document to be updated. On an update of the document by the backend, a frontend may be updated so that a user of the client device can review and consume the updated content.

In other cases, the output processor/gateway can be configured to determine whether an output of the generative output service 116 is an API request that should be directed to a particular endpoint. Upon identifying an intended or specified endpoint, the output processor can transmit the output, as an API request to that endpoint. The gateway may receive a response to the API request which in some examples, may be directed to yet another system (e.g., a notification that an object has been modified successfully in one system may be transmitted to another system).

More generally, the embodiments described herein and with particular reference to FIG. 1 relate to systems for collecting user input, modifying that user input into a particularly engineered prompt, and submitting that prompt as input to a trained large language model. Output of the LLM can be used in a number of suitable ways In some embodiments, user input can be provided by text input that can be provided by a user typing a word or phrase into an editable dialog box such as a rich text editing frame rendered within a user interface of a frontend application on a display of a client device. For example, the user can type a particular character or phrase in order to instruct the frontend to enter a command receptive mode. In some cases, the frontend may render an overlay user interface that provides a visual indication that the frontend is ready to receive a command from the user. As the user continues to type, one or more suggestions may be shown in a modal UI window.

These suggestions can include and/or may be associated with one or more "preconfigured prompts" that are engineered to cause an LLM to provide particular output. More specifically, a preconfigured prompt may be a static string of characters, symbols and words, that causes—deterministically or pseudo-deterministically—the LLM to provide consistent output. For example, a preconfigured prompt may be "generate a summary of changes made to all documents in the last two weeks." Preconfigured prompts can be associated with an identifier or a title shown to the user, such as "Summarize Recent System Changes." In this example, a button with the title "Summarize Recent System Changes" can be rendered for a user in a UI as described herein. Upon interaction with the button by the user, the prompt string "generate a summary of changes made to all documents in the last two weeks" can be retrieved from a database or other memory, and provided as input to the generative output service 116.

Suggestions rendered in a UI can also include and/or may be associated with one or more configurable or "templatized prompts" that are engineered with one or more fields that can be populated with data or information before being provided as input to an LLM. An example of a templatized prompt may be "summarize all tasks assigned to ${user} with a due date in the next 2 days." In this example, the token/field/variable ${user} can be replaced with a user identifier corresponding to the user currently operating a client device.

This insertion of an unambiguous user identifier can be preformed by the client device, the platform backend, the transcript processing service, the prompt management service, or any other suitable software instance. As with preconfigured prompts, templatized prompts can be associated with an identifier or a title shown to the user, such as "Show My Tasks Due Soon." In this example, a button with the title "Show My Tasks Due Soon" can be rendered for a user in a UI as described herein. Upon interaction with the button by the user, the prompt string "summarize all tasks assigned to user123 with a due date in the next 2 days" can be retrieved from a database or other memory, and provided as input to the generative output service 116.

Suggestions rendered in UI can also include and/or may be associated with one or more "engineered template prompts" that are configured to add context to a given user input. The context may be an instruction describing how particular output of the LLM/engine should be formatted, how a particular data item can be retrieved by the engine, or the like. As one example, an engineered template prompt may be "${user prompt}. Provide output of any table in the form of a tab delimited table formatted according to the markdown specification." In this example, the variable ${user prompt} may be replaced with the user prompt such that the entire prompt received by the generative output service 116 can include the user prompt and the example sentence describing how a table should be formatted.

In yet other embodiments, a suggestion may be generated by the generative output service 116. For example, in some embodiments, a system as described herein can be configured to assist a user in overcoming a cold start/blank page problem when interacting with a new document, new issue, or new board for the first time. For example, an example backend system may be Kanban board system for organizing work associated with particular milestones of a particular project. In these examples, a user needing to create a new board from scratch (e.g., for a new project) may be unsure how to begin, causing delay, confusion, and frustration.

In these examples, a system as described herein can be configured to automatically suggest one or more prompts configured to obtain output from an LLM that programmatically creates a template board with a set of template cards. Specifically, the prompt may be a preconfigured prompt as described above such as "generate a JSON document representation of a Kanban board with a set of cards each representing a different suggested task in a project for creating a new iced cream flavor." In response to this prompt, the generative output service 116 may generate a set of JSON objects that, when received by the Kanban platform, are rendered as a set of cards in a Kanban board, each card including a different title and description corresponding to different tasks that may be associated with steps for creating a new ice cream flavor. In this manner, the user can quickly be presented with an example set of initial tasks for a new project.

In yet other examples, suggestions can be configured to select or modify prompts that cause the generative output service 116 to interact with multiple systems. For example, a suggestion in a documentation system may be to create a new document content section that summarizes a history of agent interactions in an ITSM system. In some cases, the generative output service 116 can be called more than once (and/or it may be configured to generate its own follow-up prompts or prompt templates which can be populated with appropriate information and re-submitted to the generative output service 116 to obtain further generative output. More simply, in some embodiments, generative output may be recursive, iterative, or otherwise multi-step in some embodiments.

These foregoing embodiments depicted in FIG. 1 and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, it may be appreciated that all software instances described above are supported by and instantiated over physical hardware and/or allocations of processing/memory capacity of physical processing and memory hardware. For example, the first platform backend 108 may be instantiated by cooperation of a processor and memory collectively represented in the figure as the resource allocations 108*a*.

Similarly, the second platform backend 110 may be instantiated over the resource allocations 110*a* (including processors, memory, storage, network communications systems, and so on). Likewise, the transcript processing service 112 is supported by a processor and memory and network connection (and/or database connections) collectively represented for simplicity as the resource allocations 112*a*.

The prompt management service 114 can be supported by its own resources including processors, memory, network connections, displays (optionally), and the like represented in the figure as the resource allocations 114*a*.

In many cases, the generative output service 116 may be an external system, instantiated over external and/or third-party hardware which may include processors, network connections, memory, databases, and the like. In some embodiments, the generative output service 116 may be instantiated over physical hardware associated with the host servers 102. Regardless of the physical location at which (and/or the physical hardware over which) the generative output service 116 is instantiated, the underlying physical hardware including processors, memory, storage, network connections, and the like are represented in the figure as the resource allocations 116*a*.

Further, although many examples are provided above, it may be appreciated that in many embodiments, user permissions and authentication operations are performed at each communication between different systems described above. Phrased in another manner, each request/response transmitted as described above or elsewhere herein may be accompanied by user authentication tokens, user session tokens, API tokens, or other authentication or authorization credentials.

Generally, generative output systems, as described herein, should not be usable to obtain information from an organizations datasets that a user is otherwise not permitted to obtain. For example, a prompt of "generate a table of social security numbers of all employees" should not be executable. In many cases, underlying training data may be siloed based on user roles or authentication profiles. In other cases, underlying training data can be preconditioned/scrubbed/tagged for particularly sensitive datatypes, such as personally identifying information. As a result of tagging, prompts may be engineered to prevent any tagged data from being returned in response to any request. More particularly, in some configurations, all prompts output from the prompt management service 114 may include a phrase directing an LLM to never return particular data, or to only return data from particular sources, and the like.

In some embodiments, the system 100 can include a prompt context analysis instance configured to determine whether a user issuing a request has permission to access the resources required to service that request. For example, a prompt from a user may be "Generate a text summary in Document123 of all changes to Kanban board 456 that do not have a corresponding issue tagged in the issue tracking system." In respect of this example, the prompt context analysis instance may determine whether the requesting user has permission to access Document123, whether the requesting user has written permission to modify Document123, whether the requesting user has read access to Kanban board 456, and whether the requesting user has read access to referenced issue tracking system. In some embodiments, the request may be modified to accommodate a user's limited permissions. In other cases, the request may be rejected outright before providing any input to the generative output service 116.

Furthermore, the system can include a prompt context analysis instance or other service that monitors user input and/or generative output for compliance with a set of policies or content guidelines associated with the tenant or organization. For instance, the service may monitor the content of a user input and block potential ethical violations including hate speech, derogatory language, or other content that may violate a set of policies or content guidelines. The service may also monitor output of the generative engine to ensure the generative content or response is also in compliance with policies or guidelines. To perform these monitoring activities, the system may perform natural language processing on the monitored content in order to detect key words or phrases that indicate potential content violations. A trained model may also be used that has been trained using content known to be in violation of the content guidelines or policies.

Further to these foregoing embodiments, it may be appreciated that a user can provide input to a frontend of a system in a number of suitable ways, including by providing input as described above to a frame rendered with support of a transcript processing service.

As further described herein, the system 100 supports collaboration content creation from video conferencing content. In one or more embodiments, the system 100 receives a notification that a video conference session has concluded at a video conferencing platform. In some examples, the video conferencing platform may be a third-party platform and the notification is received at the transcript processing service 112 via an interface of system 100 that is configured to communicate with the third-party video conferencing platform. The receipt of the notification is a trigger for the transcript processing service 112 to request a transcript of the video conference session from the video conferencing platform. In some examples, and as further discussed herein, the notification may be a trigger of an automation rule. The video conferencing platform provides a response, via the interface to the third-party platform, that includes the transcript for the video conference session.

From the transcript, the system 100 (e.g., the transcript processing service 112) generates a transcript-processing prompt to provide to a generative output engine via a second interface. As further discussed herein, the transcript-processing prompt may use a prompt template, where the prompt template may be different in different circumstances. For examples the prompt template may be one of a set of prompt templates selected by the prompt management service 114 may depend on a platform of the system 100. The prompt template may also be selected based on the desired output format for the generative response. For example, a user may set up an automation rule for a documentation platform where the requested output format for the generative response following the processing of the transcript is a bulleted list of action items from the transcript and a one paragraph summary of the meeting based on the transcript, such that the prompt template may indicate for the generative output engine to provide this output format.

The generative output uses the transcript-processing prompt to prepare and provide a response (which may also be referred to as a generative response) to the transcript-processing prompt. The response includes at least in part a natural language string according to the output format indicated by the prompt. The transcript processing service 112 then creates a new collaboration content object, or modifies an existing object, using at least a portion of the generative response.

In some embodiment, the transcript processing service 112 and/or system 100 include a first interface configured to communicate with a video conferencing platform and a second interface configured to communicate with a generative output engine. The transcript processing service 112 is coupled with both the first interface and the second interface. In one or more embodiments, the transcript processing service 112 is configured to receive, via the first interface, a notification that a video conference session has concluded at the video conferencing platform. The transcript processing service 112 is further configured to provide, to the video conferencing platform via the first interface and responsive to receiving the notification to the video conferencing platform, a first application program interface call that indicates a request for a transcript of the video conference session. The transcript processing service 112 is further configured to obtain, via the first interface and responsive to the first application program interface call, the transcript from the video conferencing platform, the transcript including natural language text generated from audio of the video conference session. The transcript processing service 112 is further configured to provide, to the generative output engine via the second interface and using a second application program interface call, a transcript-processing prompt comprising at least a portion of the natural language text of the transcript. The transcript processing service 112 is further configured to obtain, via the second interface and responsive to the second application program interface call, a generative response including a natural language string. The transcript processing service 112 is further configured to cause generation or modification of a collaboration content object for a platform of the content collaboration system, the collaboration content object including at least a portion of the generative response.

In some embodiments, the transcript-processing prompt comprises at least a portion of the natural language text of the transcript and an indication of an output format for the generative response.

In some embodiments, the transcript processing service 112 further includes a third interface configured to communicate with at least one client device, and the transcript processing service 112 is further configured to cause, via the third interface, generation of a graphical user interface of the content collaboration system at the at least one client device, the graphical user interface including one or more user inputs to accept a user indication of an output format for the generative response.

In some embodiments, the output format comprises one or more information presentation types, the one or more information presentation types for the transcript including one or more of a list of key point, a list of action items, a summary page, or a summary paragraph.

In some embodiments, causing modification of the collaboration content object includes modifying one or more tasks of an issue tracking platform of the content collaboration system, or one or more pages of a documentation platform of the content collaboration system In some embodiments, causing modification of the collaboration content object includes updating a calendar item for the video conference session to include one or more portions of the generative response.

Figure 2A:
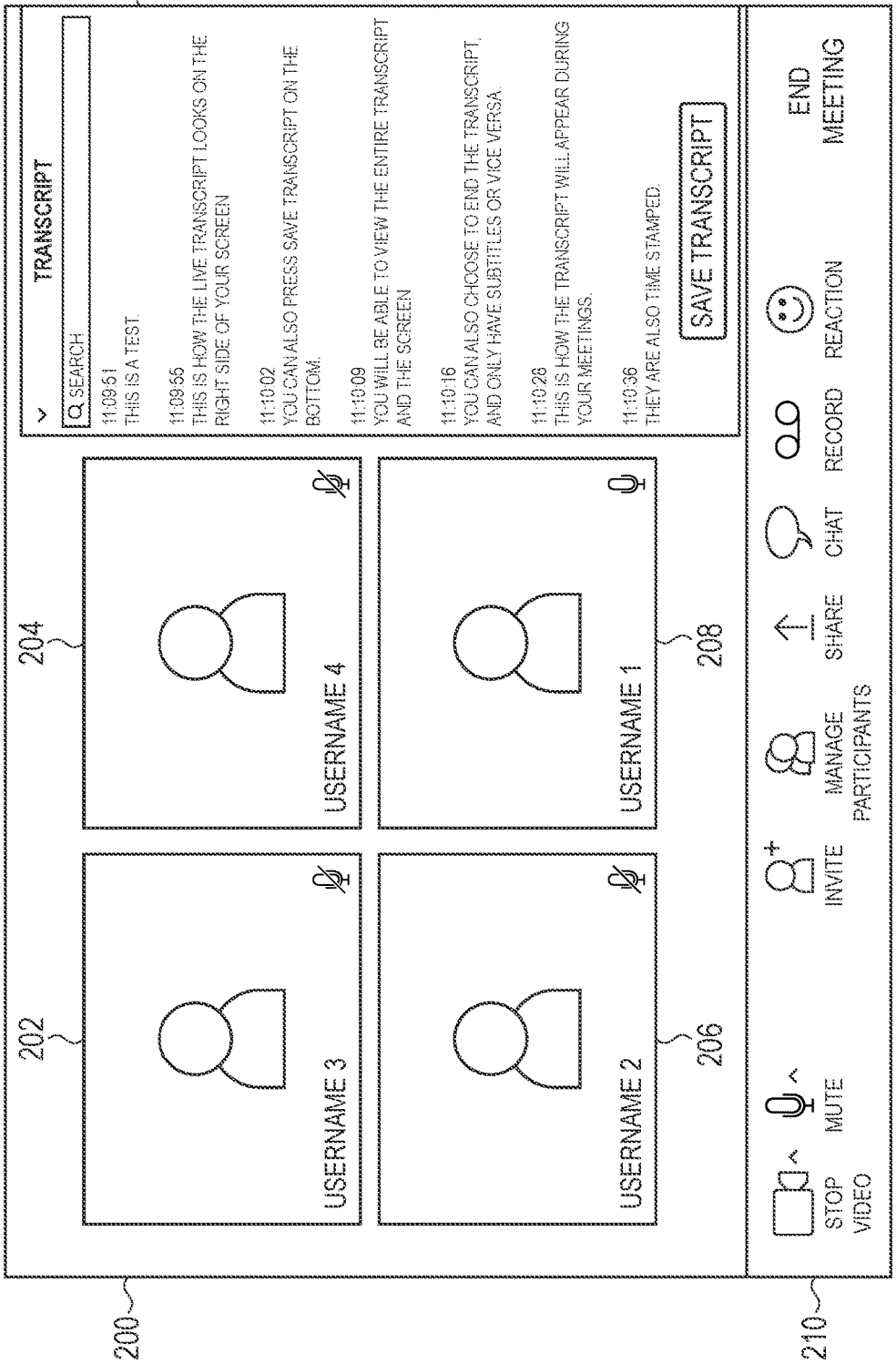
FIG. 2A depicts a user interface of a video conferencing platform during a video conference session, in accordance with aspects described herein.

FIG. 2A depicts a user interface 200 of a video conferencing platform during a video conference session, in accordance with aspects described herein. The user interface 200 of the video conferencing platform may be accessible to a user via an interface to the video conferencing platform. In some embodiments, the interface includes a control bar 210, allowing for the start/stop of video, muting and unmuting, inviting of other users, managing participants, sharing desktop or portions of a desktop, chatting via a chat dialog, initiating or stopping recording, providing a reaction to the meeting, or ending the meeting. A video display of each participant is presented to the user, either a live video feed or another representation of the user. In this case four participants are illustrated, including a first participant 202, a second participant 204, a third participant 206, and a fourth participant 208, although any number of participants may be in the meeting.

User interface 200 can also display a transcript 212, where the video conferencing platform supports the creation of a transcript 212. In the example shown with reference to user interface 200, the transcript 212 may be displayed by the video conferencing platform alongside or otherwise with the participants to the video conference on the frontend interface. For example the transcript 212 may be a "live" transcript being produced in parallel with (for example with some delay). In other examples, the transcript may be produced in the background during the video conference session. In still other examples, the transcript may be produced from an audio and/or video recording of the video conference session after the conclusion of the video conference session.

In some case, a user of a content collaboration system (e.g., system 100) logs into the video conferencing platform through a user interface of the content collaboration system, and grants the content collaboration system permission to access the video conferencing platform. The action of logging into the video conferencing platform via the content collaboration system is used to establish an authorized communication link between the video conferencing platform and the content collaboration system. In one or more embodiments, an automation rule component (e.g., of the transcript processing service 112 of the system 100) retrieves the user's account identifier (ID) for the video conferencing platform, and tags the automation rule with the user's ID.

As further described herein, following conclusion of a video conference session, a notification is received indicating that a video conference session has concluded at the video conferencing platform. In some embodiments, such notification is provided by the video conferencing platform once the recording files for the video conference session are finished processing at the video conferencing platform. The automation rule that initiates the collaboration content generation further described herein can be triggered by a webhook to the video conferencing platform. The transcript processing service 112 can then perform various tasks and actions in connection with the video conference sessions. In one or more embodiments, transcript processing service 112 (e.g., an automation rule of transcript processing service 112) can retrieve information from the meeting and use the information in an action with a value associated with the video conference session. The values can be variables that are sent to the transcript processing service 112 (e.g., the automation rule) by the trigger (e.g., via the webhook to the video conferencing platform). In some embodiment, for a trigger that is based on the notification of the conclusion of the video conference session, the variables can includes a title, transcript, summary, and so on.

In some embodiments, having retrieved a transcript from the video conferencing platform, the transcript processing service 112 can utilize the content generation services of a generative output engine to create collaboration content objects. For example, the transcript processing service 112 can generate a prompt for the generative output engine that includes one or more portions of the transcript (e.g., natural language text of the transcript). In some embodiments, one or more pieces of information in addition to text from the transcript may be provided in the prompt, such as meeting information that is metadata or within the transcript itself. For example, additional meeting information may include a date, time, meeting title, participants, organizer, timestamp information, references, links, data, graphics, audio or video clips, and so on.

In one or more embodiments, the transcript-processing prompt may indicate an output format desired for the generative response from the generative output engine. In one or more embodiments, one of the formats is a bulleted list containing the key points from the meeting. The format is associated with a first value (e.g., {{body.keyPoints}}) that can be passed to the automation rule to generate the collaboration content object. In some embodiments, another one of the formats is a paragraph-style summary that is associated with a different, second value (e.g., {{body.summaryParagraph}}) that can be passed to the automation rule. A third format is a task list of potential action items in a platform (e.g., a documentation platform) of the content collaboration system. In some embodiments, one or more of the action items may include a mention for a corresponding user (e.g., a mention with a "@") of the user is found (e.g., determined, identifies) to have an account with one or more platforms of the system 100. The task list format is associated with a third value (e.g., {{body.actionItems}}). A fourth format is a full page body template that includes additional information (e.g., in addition to a text string summary) from the meeting. The full page body format is associated with a fourth value (e.g., {{body.fullSummary}}). Although four values corresponding to four different output formats for the generative response from the generative output engine are described, more or different output formats are possible consistent with the disclosure herein.

Other values usable in the automation rule used to generate in the transcript-processing prompt included multiple values along with the transcript of the video conference session. In particular, one or more values (which may also be referred to as metadata or metadata values) representing the name of the meeting (e.g., {{body.meetingName}}), the start time of the meeting (e.g., {{body.meetingTime}}), the date of the meeting (e.g., {{body.meetingDate}}), the transcript of the meeting from the video conference platform (e.g., {{body.transcript}}), the uniform resource locator (URL) of the video recording (e.g., {{body.shareURL}}), the password to view the video recording (e.g., {{body.sharePassword}}), or other values, can be obtained from the video conferencing platform. In some embodiments one or more metadata values are received with the notification that the video conference session has concluded (e.g., via a message using a webhook). In other embodiments, one or more metadata values are obtained from the video conferencing platform for the video conference session in response to one or more application program interface calls to the video conferencing platform requesting the one or more of the metadata. In still other embodiments, one or more of the value may be identified from the transcript, either from within the natural language text of the transcript or from metadata associated and delivered along with the transcript.

One or more of the described values can be placed into a body or other field for a collaboration content object of a platform using automation rules. For example, the third value (e.g., {{body.actionItems}}) and the fourth value ({{body.fullSummary}}) may be inserted for a body of a page (e.g., one type of a collaboration content object) for a documentation platform, along with a value representing the name of the meeting ({{body.meetingName}}), the page created in response to the running of an automation rule following notification of the completion of a video conference session. In another example, the first value (e.g., {{body.summaryParagraph}}) and the third value (e.g., {{body.actionItems}}) may be inserted into a ticket of an issue tracking platform, along with the URL of the video recording (e.g., {{body.shareURL}}).

Figure 2B:
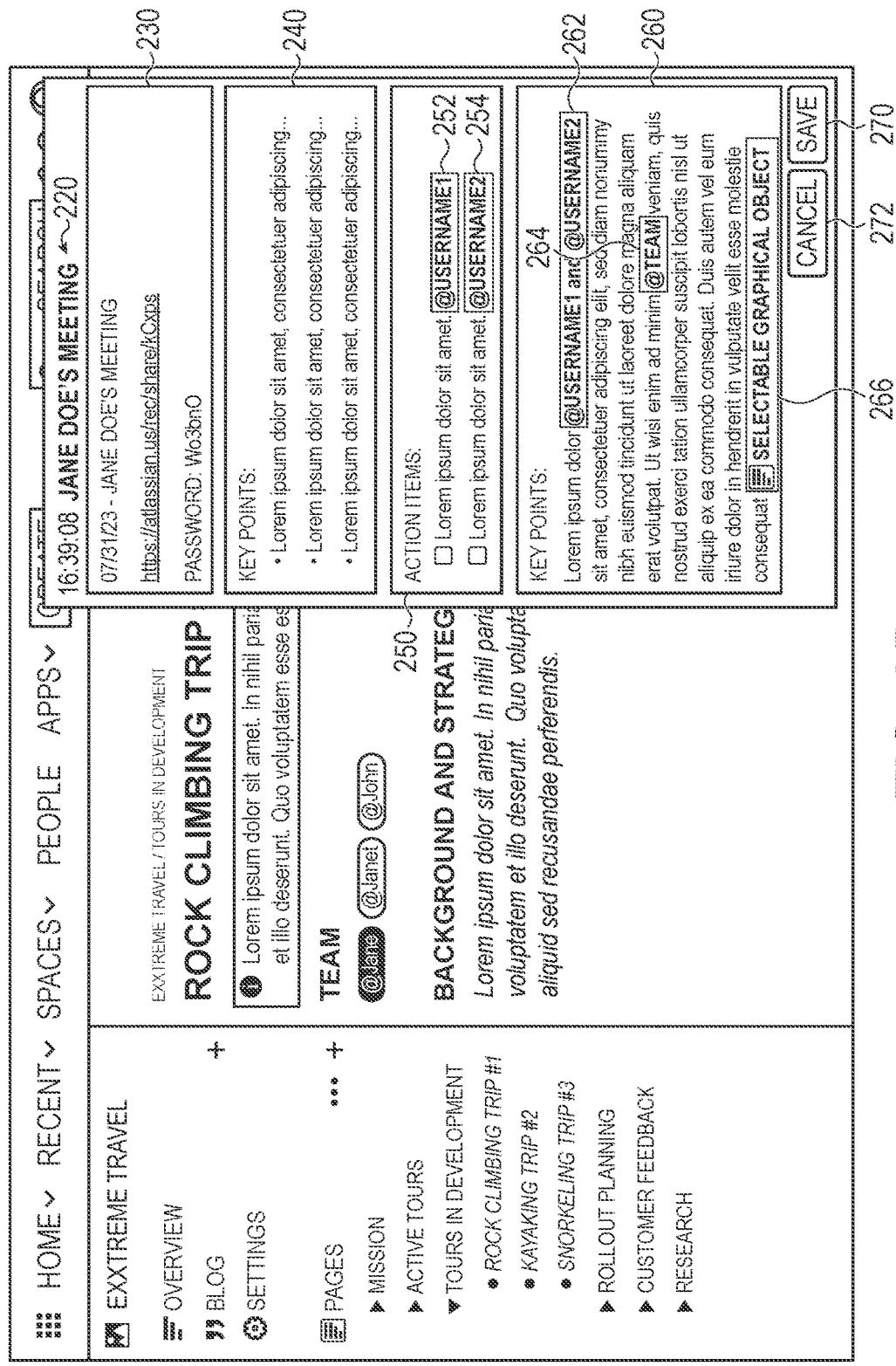
FIG. 2B depicts a user interface of a documentation platform of the system 100, in accordance with aspects described herein.

FIG. 2B depicts a user interface 201 of a documentation platform of the system 100, in accordance with aspects described herein. User interface 201 depicts a draft page of a documentation platform generated as a result of a notification from a video conferencing platform indicating that a video conference session has concluded. In particular, the draft page includes a title 220, video recording information 230, key points 240, action items 250, and summary 260.

As further discussed herein, the page can be the collaboration content object of a documents platform generated based on a generative response. In one or more examples, the title 220 and video recording information 230 of the page are populated using the automation rule by the insertion of metadata values, obtained as described herein. In one or more embodiments, the title 220 may be populated for the draft page using values representing the name of the meeting (e.g., {{body.meetingName}}) and the start time of the meeting (e.g., {{body.meetingTime}}). The video recording information 230 may be populated for the draft page using values representing the date of the meeting (e.g., {{body.meetingDate}}), the name of the meeting (e.g., {{body.meetingName}}), the URL of the video recording (e.g., {{body.shareURL}}), and the password to view the video recording (e.g., {{body.sharePassword}}).

In one or more embodiments, the key points 240, action items 250, and summary 260 are based on values generated by a generative output engine, as further described herein. In one or more embodiments, values for the key points 240, action items 250, and summary 260 may be generated by the generative output engine in response to a transcript-processing prompt that includes at least a portion of the natural language text of the transcript and an indication of an output format for key points, an output format for action items, and an output format for a summary paragraph.

In other embodiments, multiple API calls may be used to obtain equivalent responses according to the output format that includes the values for the key points 240, action items 250, and summary 260. For example, a first API call can include a first prompt that includes at least a portion of the transcript along with an indication of the format for a list containing the key points from the meeting, a second API call can include a second prompt that includes at least a portion of the transcript along with an indication of the format for a task list, and a third API call can include a third prompt that includes at least a portion of the transcript along with an indication of the format for the paragraph-style summary.

The key points 240 video recording information 230 may be populated for the draft page using values representing the date of the meeting (e.g., {{body.meetingDate}}).

The action items 250 may be populated for the draft page using values representing a task or action items for the meeting (e.g., {{body.actionItems}}). In one or more embodiments, the generative response includes a natural language string according to the output format The summary 260 may be populated for the draft page using values representing the date of the meeting (e.g., {{body.meetingDate}}).

In one or more embodiments described herein, the transcript processing service 112 performs post-processing on the generative response from the generative output engine. Post-processing includes analyzing the generative response to identify content that is mappable to references or other objects of the platform of the content collaboration system.

In one example, the post-processing includes searching the natural language string of the generative response to match individual names to references of the platform. The platform may maintain a database of users in database 118, including usernames for each of the users. More generally system 100 may also maintain a database of users applicable across multiple platforms of the system. The transcript processing service may use one or more matching algorithms or techniques (e.g., a fuzzy, or approximate, name matching algorithm) to identify names and match names to the database of users. In the example of user interface 201, the transcript processing service 112 identified two names with the generative response for the action items 250, and replaced the textual names with references to the usernames of the corresponding users, @Usemame1 252 and @Username2 252. The transcript processing service 112 also identified two names with the generative response for the summary 260, and replaced the textual names with references to two usernames, @Usemame1 and @Username2 262.

In another example, the post-processing includes searching the natural language string of the generative response to match teams names to teams references of the platform. Similar to individual usernames, team names may be matched from a database of team names. In the example of summary 260, the transcript processing service 112 identified one team name within the generative response for the summary 260, and replaced the team name with a reference to the team name, @Team 264.

The references that are mappable can also include references to objects of one or more platforms of the system 100, such as a page of a documentation platform, a ticket of an issue tracking platform, a board of a board system platform, of a card of a project management platform. In some examples, the references to objects within the system 100 can be in the form of selectable graphical objects. In one or more embodiments, post-processing includes searching the natural language string of the generative response to match references to content of one or more platforms of the system 100. In the illustrated example of user interface 201, the post-processing has identified a reference to a different page (e.g., other than the instant draft page) and replaced the text or inserted a selectable graphical object 266 with the identified page as the target content.

In some embodiments, the user interface 201 is presented to the user as a draft. The user can select to save via a save input 270 the draft page as a new page within the documentation platform, or cancel via a cancel input 272 to abort the page creation. In some embodiments, the draft page may be presented to the user in an editable form, so that the user can update text, references, or other aspects of the draft page prior to saving.

Figure 3:
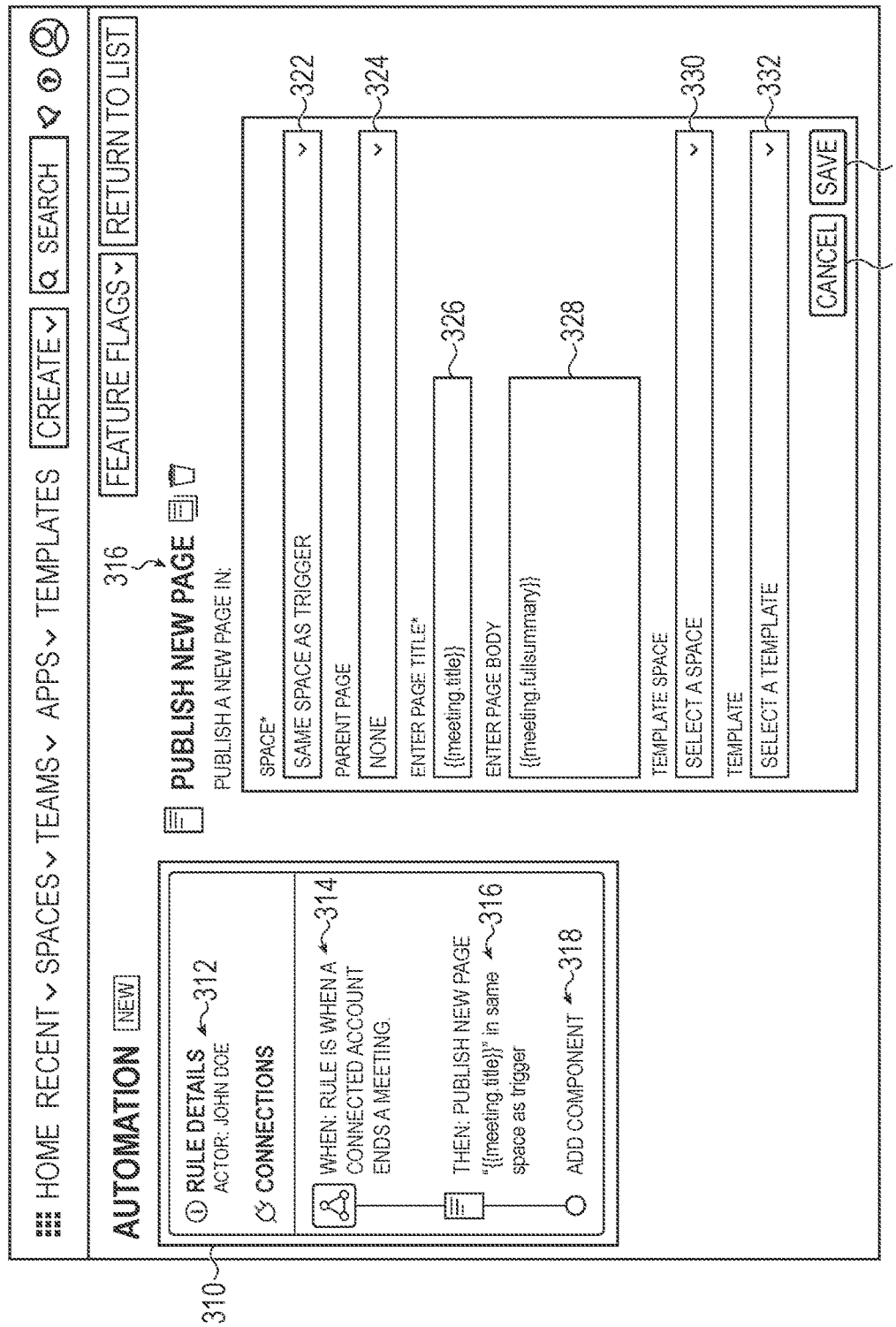
FIG. 3 depicts an example frontend interface that supports collaboration content creation from video conferencing content, in accordance with aspects described herein.

FIG. 3 depicts an example frontend interface 300 that supports collaboration content creation from video conferencing content, in accordance with aspects described herein. Frontend interface 300 may also be referred to as a UI or GUI.

Portions making up an automation rule are represented and shown in an area for an automation rule 310. The rule title and rule title can provide information related to the automation rule, such as an actor 312 for the rule. Changes performed by the automation rule are seen as being performed by the actor 312. In one or more embodiments, the actor 312 is the person who created the rule.

Event trigger 314 indicates the trigger of the automation rule, and may be described in summary fashion by a trigger summary. In one example, the event trigger may be "When: Rule is when a connected accounts ends a meeting," the connected account being an account (e.g., connected as described herein) of a video conferencing platform.

In one or more embodiments, the automation rule always begins with a trigger component, the trigger being the catalysts that sets the execution of the automation rule in motion, and may also include an event condition (which may also be referred to as just a condition) that must be met in order for the automation rule to continue to run. Though not shown for the automation rule 310 illustrated with reference to frontend interface 300, the automation rule to create collaboration content creation from video conferencing content can include one or more even conditions, for example that one or more participants in the video conference session are a member of a certain team. In some examples, there is a single one of event conditions. In other embodiments, multiple of event conditions are used, and may be set to occur at any point within the automation rule chain. In one or more embodiments, event condition(s) are not present. In some embodiments, event condition(s) are in if-then or if-then-else form.

In one or more embodiments, examples of event condition(s) include a user, a database query (e.g., a Confluence querying language (CQL)), such as a query in the form of an "if" statement for a contents of a page, blog, comment, or attachment, a compare, an if-else statement, or a combination of these. In some embodiments, these conditions are for a documentation platform.

In one or more embodiments, examples of event condition(s) include compare functions, which may be values or regular expressions. In one or more embodiments, values for a compare function may include one or more of an issue, conditional logic, users, test fields, date and time, JavaScript Object Notation (JSON) function, math expression, list, or a combination of these. In some embodiments, these conditions are for an issue tracking platform.

Action(s) 316 indicates the action to be performed following the event trigger and, if present, if the event condition of the automation rule are met. In the example of automation rule 310 the action is "Then: Publish new page." The action 316 also includes an action object that indicates the object on which the action is performed. In the example of automation rule 310 the action object is the page of a document platform with {{meeting.title}} as the title, the page created in a same space as the trigger. Action 316 is what the rule is to do or, stated differently, what happens if the automation rule executes successfully.

In one or more embodiments, examples of other actions include page archiving, page ownership changing, page status changing, page copying, page deletion, page moving, new page publishing, page restriction, blog deletion, comment addition, label addition, label removing, watcher management, space permission adding, space archiving, or a combination of these. In some embodiments, these actions are for a documentation platform.

In one or more embodiments, other examples of actions include emailing sending, application messaging sending, text message sending, web request sending, variable creation, action logging, or a combination of these. In some embodiments, these actions are for an issue tracking platform.

In some embodiments, component addition field 318 can be used to manually add components to the automation rule, such as further event conditions or actions.

A component modification area can be used to modify one or more components of the automation rule. For the example frontend interface 300, depicting the action of publishing a new page (or draft new page) of a documentation platform as a result of receiving the notification that the video conference session has concluded. Space field 322 is selectable to define whether the page is published in a same space as a trigger, or is published in a different space that may be selected. Parent page field 324 can be used in a hierarchy of pages, where the new page may be created as a child to the specified parent page, if any.

Page title field 326 may be a plaintext string, or a variable, or a combination of text and variable values. In the examples of frontend interface 300, the value {{meeting.title}} as a variant is provided. As described above, the value {{meeting.title}} is obtained as part of the actions triggered by receiving the notification that the video conference session has concluded at the video conferencing platform, for example from the video conferencing platform, or derived or otherwise determined from the transcript by the generative output engine.

Page body field 328 may be a plaintext string, or a variable, or a combination of text and variable values. In the examples of frontend interface 300, the value {{meeting.fullsummary}} as a variant is provided. As described above, the value {{meeting.fullsummary}} is obtained as part of the actions triggered by receiving the notification that the video conference session has concluded at the video conferencing platform. In some embodiments, the page body field 328 may include multiple values selected from {{body.meetingName}}, {{body.meetingTime}}, {{body.meetingDate}}, {{body.transcript}}, {{body.shareURL}}, {{body.sharePassword}}, {{body.summaryParagraph}}, {{body.keyPoints}}, {{body.actionItems}}, or {{body.fullSummary}}. In addition, one or more additional values as variants may be defined.

Figure 4:
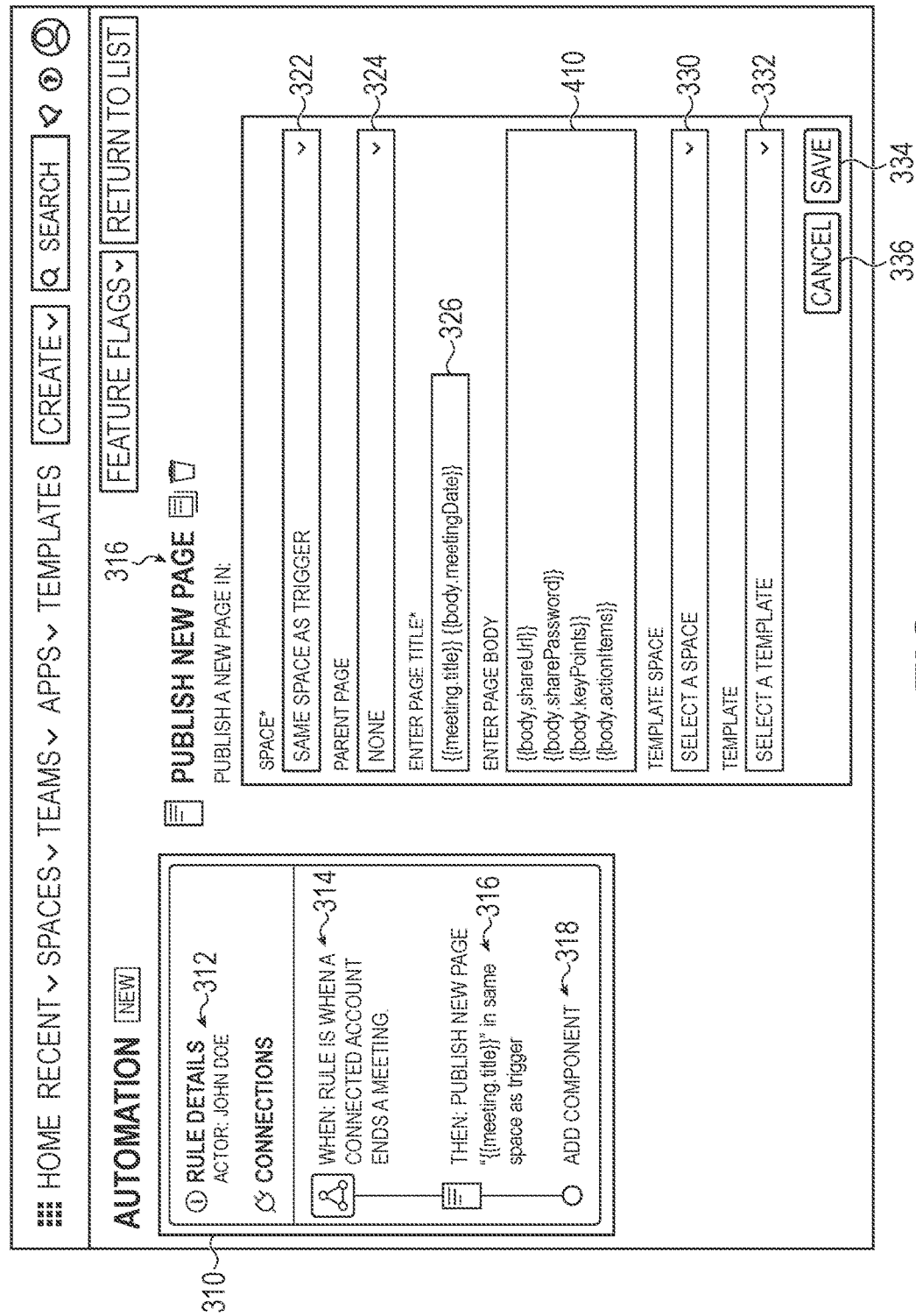
FIG. 4 depicts an example frontend interface that supports collaboration content creation from video conferencing content, in accordance with aspects described herein.

FIG. 4 depicts an example frontend interface 400 that supports collaboration content creation from video conferencing content, in accordance with aspects described herein. The example automation rule of frontend interface 400 is substantially similar to the automation rule discussed with reference to frontend interface 300 above, example for the contents of the page title field 326 and page body field 328. The page title field 326 can include multiple values, for example {{body.meetingName}} and {{body.meetingDate}} variants, for example as specified by a user in an automation rule. The page title field 326 can include multiple values, for example {{body.shareURL}}, {{body.sharePassword}}, {{body.keyPoints}}, and {{body.actionItems}} variants, for example as specified by a user in the automation rule. In both cases natural text, as well as punctuation and various characters (e.g., ampersand, tabs, carriage return, etc.) can be inserted by a user as desired to tailor the appearance of resultant draft pages.

FIG. 5 depicts a user interface 500 of an issue tracking platform of the system 100, in accordance with aspects described herein. User interface 500 depicts a draft ticket of the issue tracking platform generated as a result of a notification from a video conferencing platform indicating that a video conference session has concluded. In particular, the draft ticket includes a project name 502, issue type field 504 indicating a task as the issue type, a summary field 506, a reporter identifier 508, components 510, a description field 512, a priority field 514 indicating a priority associated with the draft ticket, a labels field 516, a linked issues field 518, and issue selection field 520, and assignee field 522.

As further discussed with reference to the automation rules that support collaboration content creation discussed with reference to the frontend interface 300 and the frontend interface 400, one or more fields of the draft ticket of the user interface 500 can be populated, using values, with text or other information from or associated with a transcript. In some examples, one or more values selected from {{body.meetingName}}, {{body.meetingTime}}, {{body.meetingDate}}, {{body.transcript}}, {{body.shareURL}}, {{body.sharePassword}}, {{body.summaryParagraph}}, {{body.keyPoints}}, {{body.actionItems}}, or {{body.fullSummary}} may be used. In some embodiments, the values are not textual, but pass or set a value. For example, the value from the transcript for the video conference session, or obtained from the video conferencing platform, can be used by the automation rule to set a priority level to "Normal" for the priority field 514 based on terms that appears in the transcript. As another example, the assignee field 522 may be used to assign the ticket to a particular person or team based on the transcript.

In some embodiments, a ticket such as the ticket illustrated in the user interface 500, is presented to the user as a draft. The user can select to create the ticket from the draft via a create input 524 to create the draft ticket as a new ticket within the issue tracking platform, or cancel via a cancel input 526 to abort the ticket creation. In some embodiments, the draft ticket may be presented to the user in an editable form, so that the user can update text, references, or other aspects of the draft page prior to saving.

In one or more embodiments, transcript-derived collaboration content may be used in integration with a calendar item used in one or more platforms of the system 100. In one example, a summary of a video conferencing session that is generated by the generative output engine from a transcript is populated into the team meeting. For example, the calendar item is the calendar item associated with the original video conferencing session. Following conclusion of the video conferencing session, that calendar item can be updated, for example, so that a user or participant in the meeting views that calendar item, a summary (or other transcript-derived information), such as a full summary, is available for review. In other embodiments a single summary paragraph, set of action items, set of key points, or other information may be populated into the calendar invite.

Figure 6:
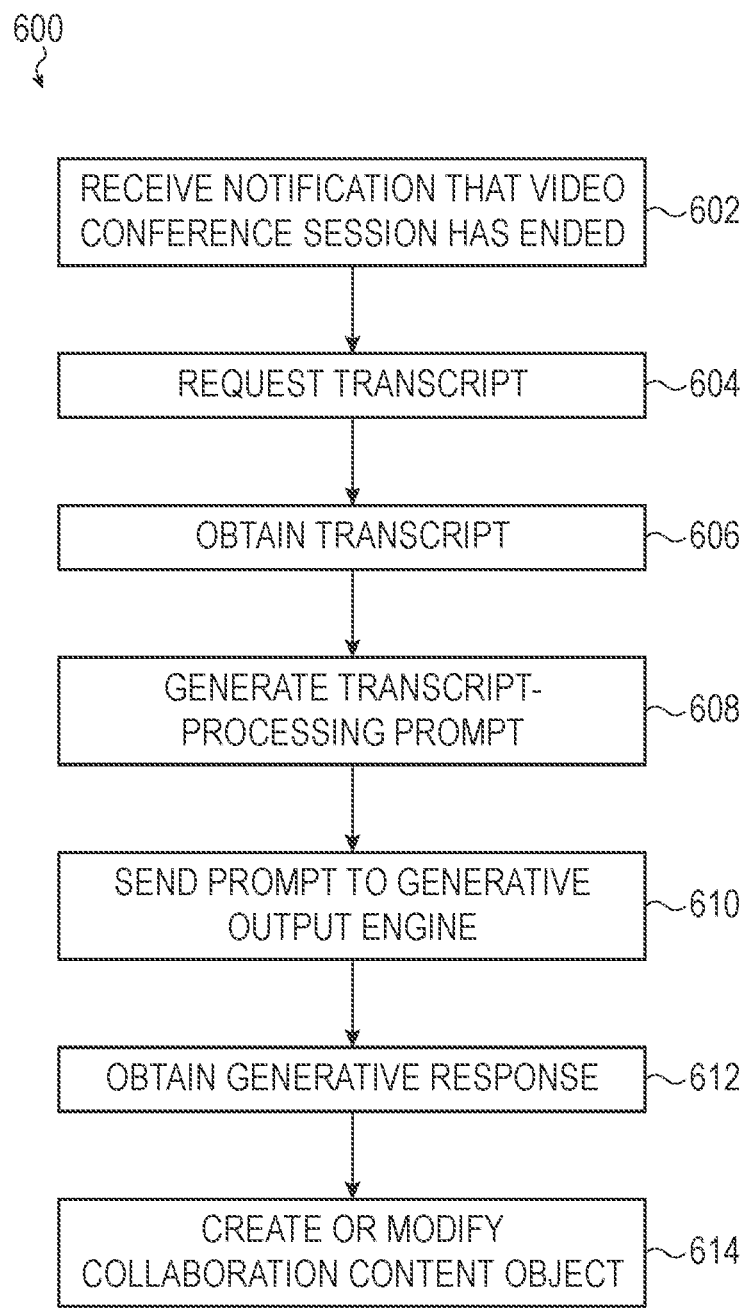
FIG. 6 shows an example method of content summary generation within a content collaboration system, according to one or more aspects described herein.

FIG. 6 shows an example method 600 of content summary generation within a content collaboration system, according to one or more aspects described herein. In one or more embodiments, method 600 supports one or more aspects of content generation in content collaboration platforms, including summary generation within selectable graphical objects, as further described herein. The method 600 may be performed using a processor, or other components of the content collaboration system, including at least the transcript processing service 112 of the system 100.

At 602, the method 600 includes receiving a notification that a video conference session has concluded at a video conferencing platform.

At 604, the method 600 includes, in response to receiving the notification, providing, to the video conferencing platform using a first application program interface call, a request for a transcript of the video conference session.

At 606, the method 600 includes, in response to receiving the notification, obtaining the transcript from the video conferencing platform, the transcript including natural language text generated from audio of the video conference session.

At 608, the method 600 includes, in response to receiving the notification and the transcript, generating a transcript-processing prompt comprising at least a portion of the natural language text of the transcript and an indication of an output format for a generative response.

At 610 the method 600 includes, in response to receiving the notification and the transcript, providing, to a generative output engine using a second application program interface call, the transcript-processing prompt.

At 612 the method 600 includes, in response to receiving the notification and the transcript, obtaining the generative response from the generative output engine responsive to the second application program interface call, the generative response including a natural language string according to the output format At 614 the method 600 includes, in response to receiving the notification and the transcript, causing, within a platform of the content collaboration system, generation or modification of a collaboration content object of the platform that includes at least a portion of the generative response.

In one or more embodiments, the method 600 further includes, in response to receiving the notification and the transcript, processing the generative response to determine that one or more portions of the generative response are mappable to one or more references of the platform of the content collaboration system. The method 6 may further include replacing each portion of the one or more portions of the natural language string with a respective reference of the one or more references, wherein the one or more references comprise a person name, a team name, a page, a ticket, a board, or a card of the content collaboration system.

In one or more embodiments, the method 600 further includes, in response to receiving the notification, selecting, based at least in part on a meeting type for the video conference session, a first transcript-processing prompt template from a plurality of transcript-processing prompt templates, each transcript-processing prompt template associated with one of a plurality of meeting types. The method 600 may further include generating the transcript-processing prompt according to the first transcript-processing prompt template.

In one or more embodiments, the method 600 further includes causing generation of a graphical user interface of the content collaboration system, the graphical user interface including one or more user inputs to accept a user indication of the output format for the generative response, wherein the output format comprises one or more information presentation types, the one or more information presentation types for the transcript including one or more of a list of key points, a list of action items, a summary page, or a summary paragraph.

In some embodiments, processing the generative response further includes determining a set of names associated with a collaboration space for the video conference session, the set of names including one or more of a person name or a team name, wherein the one or more references comprise the set of names associated with the collaboration space.

In some embodiments, processing the generative response further includes identifying that a portion of the natural language string is a name reference that is mappable to a plurality of name references, wherein the name reference is a person name or a team name. The method 600 may also include selecting one name from the plurality of name references based at least in part on a context of the video conference session.

In some embodiments, the context of the video conference session comprises one or more of an individual participant, a team participant, a type of meeting, or a past meeting participation.

In one or more embodiments, the method 600 further includes generating, wherein the transcript-processing prompt comprises a first transcript-processing prompt and the generative response comprises a first generative response, the transcript-processing prompt by splitting the natural language text of the transcript into a plurality of portions, wherein the at least a portion of the natural language text of the transcript comprises a first portion of the plurality of portions. The method 600 may further include, in response to obtaining the first generative response, generating a second transcript-processing prompt comprising the first generative response and a second portion of the plurality of portions. The method 600 may further include, in response to obtaining the first generative response, providing, to the generative output engine using a third application program interface call, the second transcript-processing prompt. The method 600 may further include, in response to obtaining the first generative response, obtaining a second generative response from the generative output engine responsive to the third application program interface call. The method 600 may further include, in response to obtaining the first generative response, combining at least the first generative response and the second generative response to generate the collaboration content object.

In some embodiments, the first generative response comprises a first summary of the first portion of the natural language text, and the second generative response comprises a second summary of the second portion of the natural language text.

In one or more embodiments, the method 600 further includes identifying an existing content object of the content collaboration system that is referred to in the transcript, and causing generation of a link to the existing content object within the collaboration content object that includes at least the portion of the generative response.

In one or more embodiments, the method 600 further includes identifying an existing content object of the content collaboration system that is referred to in the transcript, and inserting at least a portion of content of the existing content object into the collaboration content object that includes at least the portion of the generative response.

In one or more embodiments, the method 600 further includes causing modification of the collaboration content object comprises modifying one or more parameters of a task of an issue tracking platform or a documentation platform.

The method 600 may be variously embodied, extended, or adapted, as described in the following paragraphs and elsewhere in this description.

Figure 7:
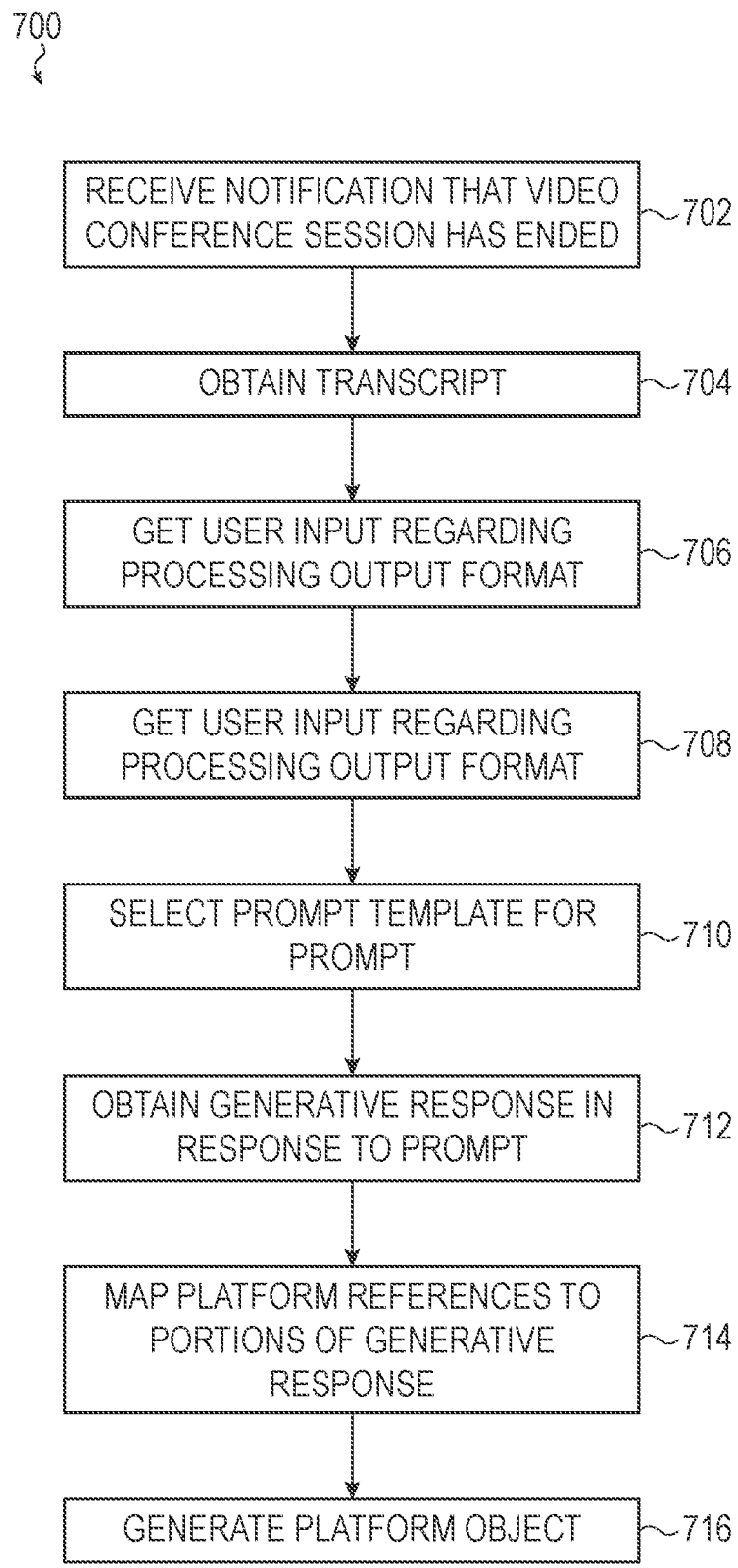
FIG. 7 shows an example method of content summary generation within a content collaboration system, according to one or more aspects described herein.

FIG. 7 shows an example method 700 of content summary generation within a content collaboration system, according to one or more aspects described herein. In one or more embodiments, method 700 supports one or more aspects of content generation in content collaboration platforms, including summary generation within selectable graphical objects, as further described herein. The method 700 may be performed using a processor, or other components of the content collaboration system.

At 702, the method 700 includes receiving a notification that a video conference session has concluded at a video conferencing platform.

At 704, the method 700 includes, in response to receiving the notification, providing, to the video conferencing platform using a first application program interface call, a request for a transcript of the video conference session.

At 706, the method 700 includes, in response to receiving the notification, obtaining the transcript from the video conferencing platform, the transcript including natural language text for the video conference session.

At 708, the method 700 includes, causing generation of a graphical user interface of the content collaboration system, the graphical user interface including one or more user inputs to accept a user indication of an output format for a generative response for the transcript, wherein the output format comprises one or more information presentation types, including one or more of a list of key points, a list of action items, a summary page, or a summary paragraph.

At 710 the method 700 includes, in response to receiving the notification, the transcript, and the user indication of the output format, selecting, based at least in part on a meeting type for the video conference session, a first transcript-processing prompt template from a plurality of transcript-processing prompt templates, each transcript-processing prompt template associated with one of a plurality of meeting types.

At 712 the method 700 includes, in response to receiving the notification, the transcript, and the user indication of the output format, generating, according to the first transcript-processing prompt template, a transcript-processing prompt comprising at least a portion of the natural language text of the transcript and the user indication of the output format. The method 700 further includes, at 712, providing, to a generative output engine using a second application program interface call, the transcript-processing prompt. The method 700 further includes, at 712, obtaining the generative response from the generative output engine responsive to the second application program interface call, the generative response including a natural language string according to the output format and associated with a platform of the content collaboration system.

At 714 the method 700 includes, in response to receiving the generative response, processing the generative response to determine that one or more portions are mappable to one or more references of the platform, and replacing each portion of the one or more portions of the natural language string with a respective reference of the one or more references. In some embodiments, the one or more references comprise a person name, a team name, a page, a ticket, a board, or a card of the content collaboration system.

At 716 the method 700 includes causing generation or modification of a collaboration content object of the platform that includes the natural language string.

The method 700 may be variously embodied, extended, or adapted, as described in the following paragraphs and elsewhere in this description. In some embodiments, one or more feature or aspect described with reference to the method 600 may combined with one or more feature or aspect of the method 700.

Figure 8A:
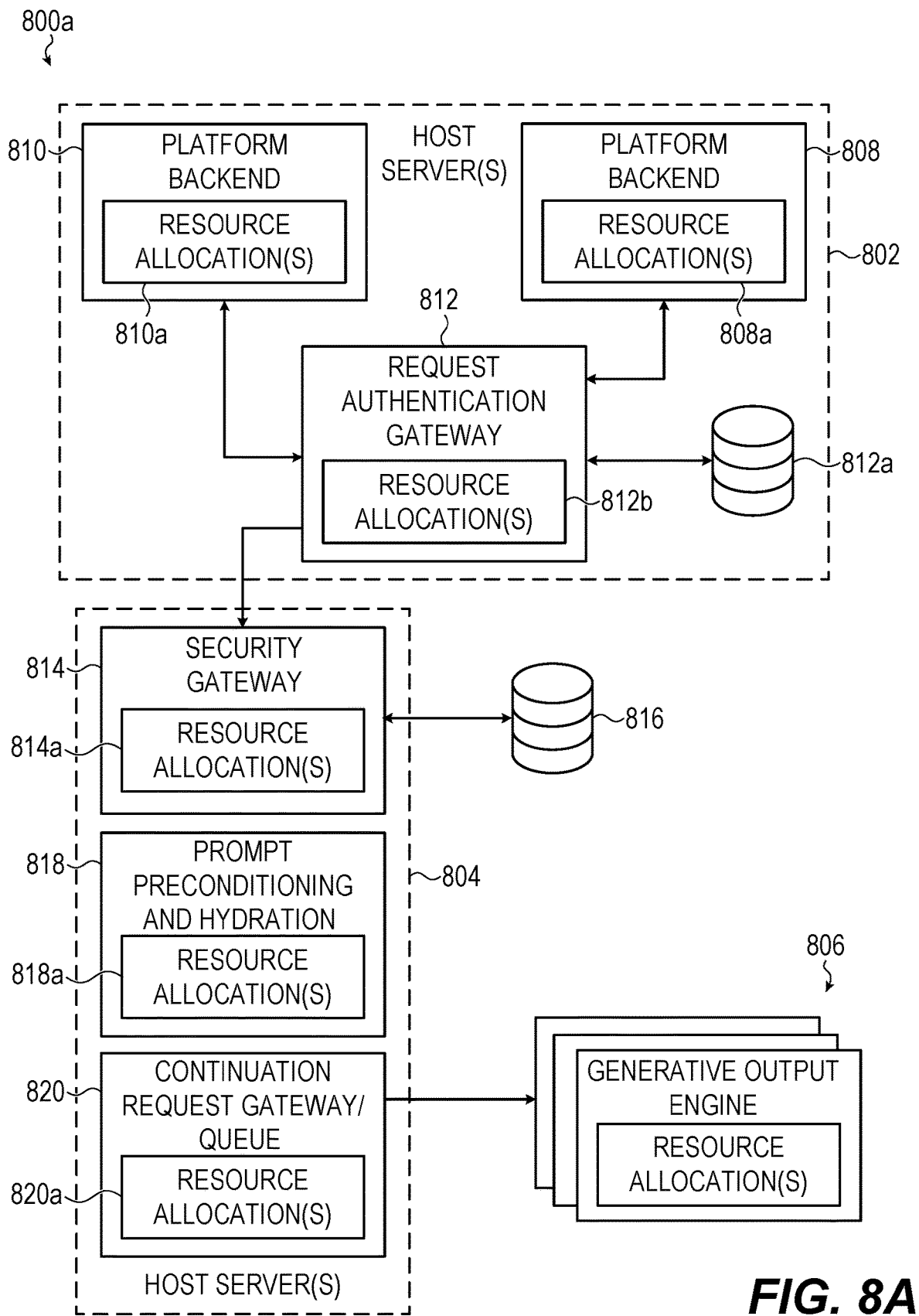
FIG. 8A depicts a simplified diagram of a system, such as described herein that can include and/or may receive input from a generative output engine.
Figure 8B:
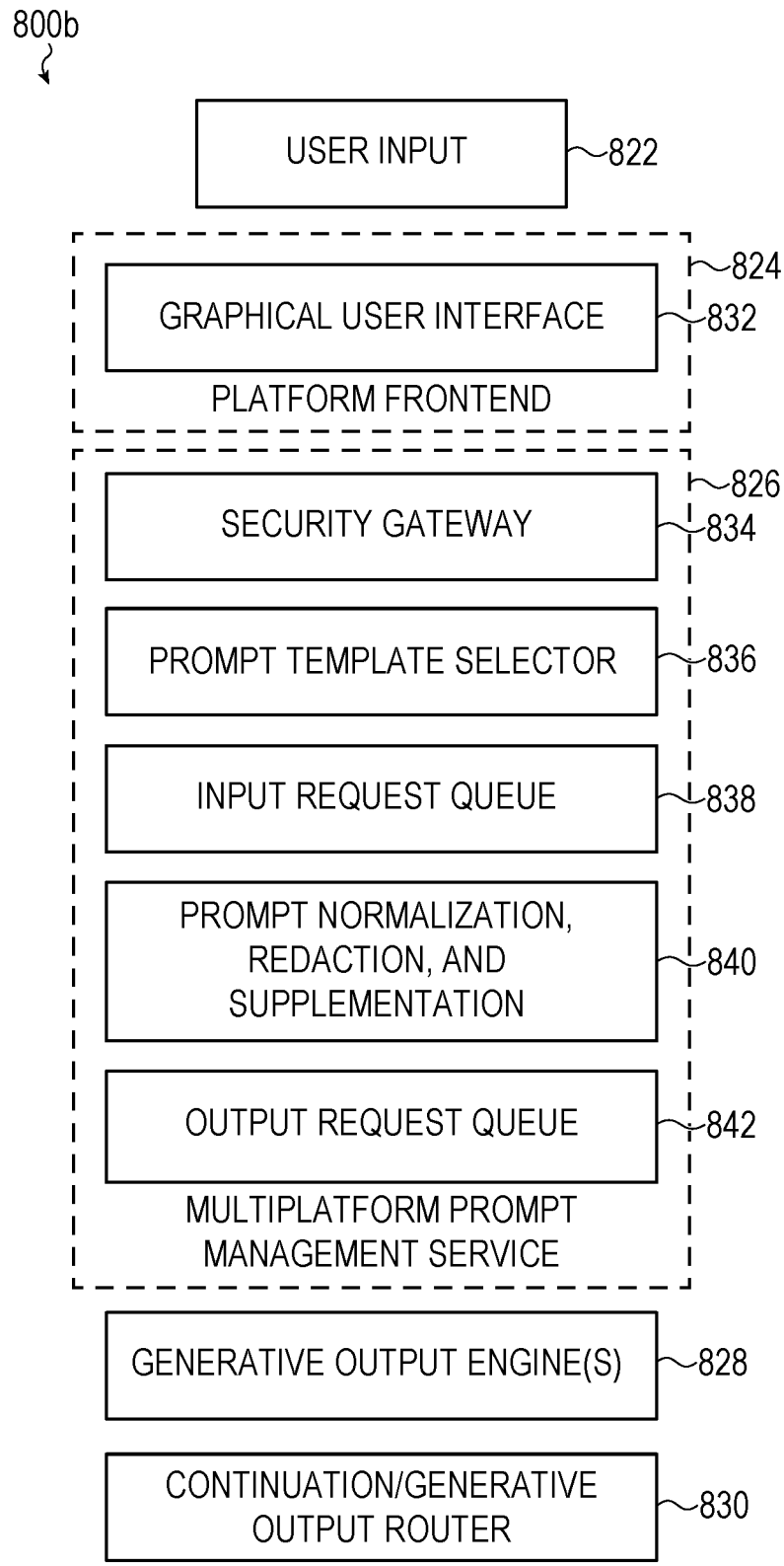
FIG. 8B depicts a functional system diagram of a system that can be used to implement a multiplatform prompt management service.

FIGS. 8A-8B depicts system diagrams and network/communication architectures that may support a system as described herein. Referring to FIG. 8A, the system 800*a* includes a first set of host servers 802 associated with one or more software platform backends. These software platform backends can be communicably coupled to a second set of host servers 804 purpose configured to process requests and responses to and from one or more generative output engines 806.

Specifically, the first set of host servers 802 (which, as described above can include processors, memory, storage, network communications, and any other suitable physical hardware cooperating to instantiate software) can allocate certain resources to instantiate a first and second platform backend, such as a first platform backend 808 and a second platform backend 810. Each of these respective backends can be instantiated by cooperation of processing and memory resources associated to each respective backend. As illustrated, such dedicated resources are identified as the resource allocations 808*a* and the resource allocations 810*a*.

Each of these platform backends can be communicably coupled to an authentication gateway 812 configured to verify, by querying a permissions table, directory service, or other authentication system (represented by the database 812*a*) whether a particular request for generative output from a particular user is authorized. Specifically, the second platform backend 810 may be a documentation platform used by a user operating a frontend thereof.

The user may not have access to information stored in an issue tracking system. In this example, if the user submits a request through the frontend of the documentation platform to the backend of the documentation platform that in any way references the issue tracking system, the authentication gateway 812 can deny the request for insufficient permissions. This example is merely one and is not intended to be limiting; many possible authorization and authentication operations can be performed by the authentication gateway 812. The authentication gateway 812 may be supported by physical hardware resources, such as a processor and memory, represented by the resource allocations 812*b*.

Once the authentication gateway 812 determines that a request from a user of either platform is authorized to access data or resources implicated in service that request, the request may be passed to a security gateway 814, which may be a software instance supported by physical hardware identified in FIG. 8A as the resource allocations 814*a*. The security gateway 814 may be configured to determine whether the request itself conforms to one or more policies or rules (data and/or executable representations of which may be stored in a database 816) established by the organization. For example, the organization may prohibit executing prompts for offensive content, value-incompatible content, personally identifying information, health information, trade secret information, unreleased product information, secret project information, and the like. In other cases, a request may be denied by the security gateway 814 if the prompt requests beyond a threshold quantity of data.

Once a particular user-initiated prompt has been sufficiently authorized and cleared against organization-specific generative output rules, the request/prompt can be passed to a preconditioning and hydration service 818 configured to populate request-contextualizing data (e.g., user ID, page ID, project ID, URLs, addresses, times, dates, date ranges, and so on), insert the user's request into a larger engineered template prompt and so on. Example operations of a preconditioning instance are described elsewhere herein; this description is not repeated. The preconditioning and hydration service 818 can be a software instance supported by physical hardware represented by the resource allocations 818*a*. In some implementations, the hydration service 818 may also be used to rehydrate personally identifiable information (PII) or other potentially sensitive data that has been extracted from a request or data exchange in the system.

One a prompt has been modified, replaced, or hydrated by the preconditioning and hydration service 818, it may be passed to an output gateway 820 (also referred to as a continuation gateway or an output queue). The output gateway 820 may be responsible for enqueuing and/or ordering different requests from different users or different software platforms based on priority, time order, or other metrics. The output gateway 820 can also serve to meter requests to the generative output engines 806.

FIG. 8B depicts a functional system diagram of the system 800*a* depicted in FIG. 8A. In particular, the system 800*b* is configured to operate as a multiplatform prompt management service supporting and ordering requests from multiple users across multiple platforms. In particular, a user input 822 may be received at a platform frontend 824. The platform frontend 824 passes the input to a prompt management service 826 that formalizes a prompt suitable for input to a generative output engine 828, which in turn can provide its output to an output router 860 that may direct generative output to a suitable destination. For example, the output router 860 may execute API requests generated by the generative output engine 828, may submit text responses back to the platform frontend 824, may wrap a text output of the generative output engine 828 in an API request to update a backend of the platform associated with the platform frontend 824, or may perform other operations.

Specifically, the user input 822 (which may be an engagement with a button, typed text input, spoken input, chat box input, and the like) can be provided to a graphical user interface 832 of the platform frontend 824. The graphical user interface 832 can be communicably coupled to a security gateway 834 of the prompt management service 826 that may be configured to determine whether the user input 822 is authorized to execute and/or complies with organization-specific rules.

The security gateway 834 may provide output to a prompt selector 836 which can be configured to select a prompt template from a database of preconfigured prompts, templatized prompts, or engineered templatized prompts. Once the raw user input is transformed into a string prompt, the prompt may be provided as input to a request queue 838 that orders different user request for input from the generative output engine 828. Output of the request queue 838 can be provided as input to a prompt hydrator 840 configured to populate template fields, add context identifiers, supplement the prompt, and perform other normalization operations described herein. In other cases, the prompt hydrator 840 can be configured to segment a single prompt into multiple discrete requests, which may be interdependent or may be independent.

Thereafter, the modified prompt(s) can be provided as input to an output queue at 842 that may serve to meter inputs provided to the generative output engine 828.

These foregoing embodiments depicted in FIGS. 8A-8B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

Figure 9A:
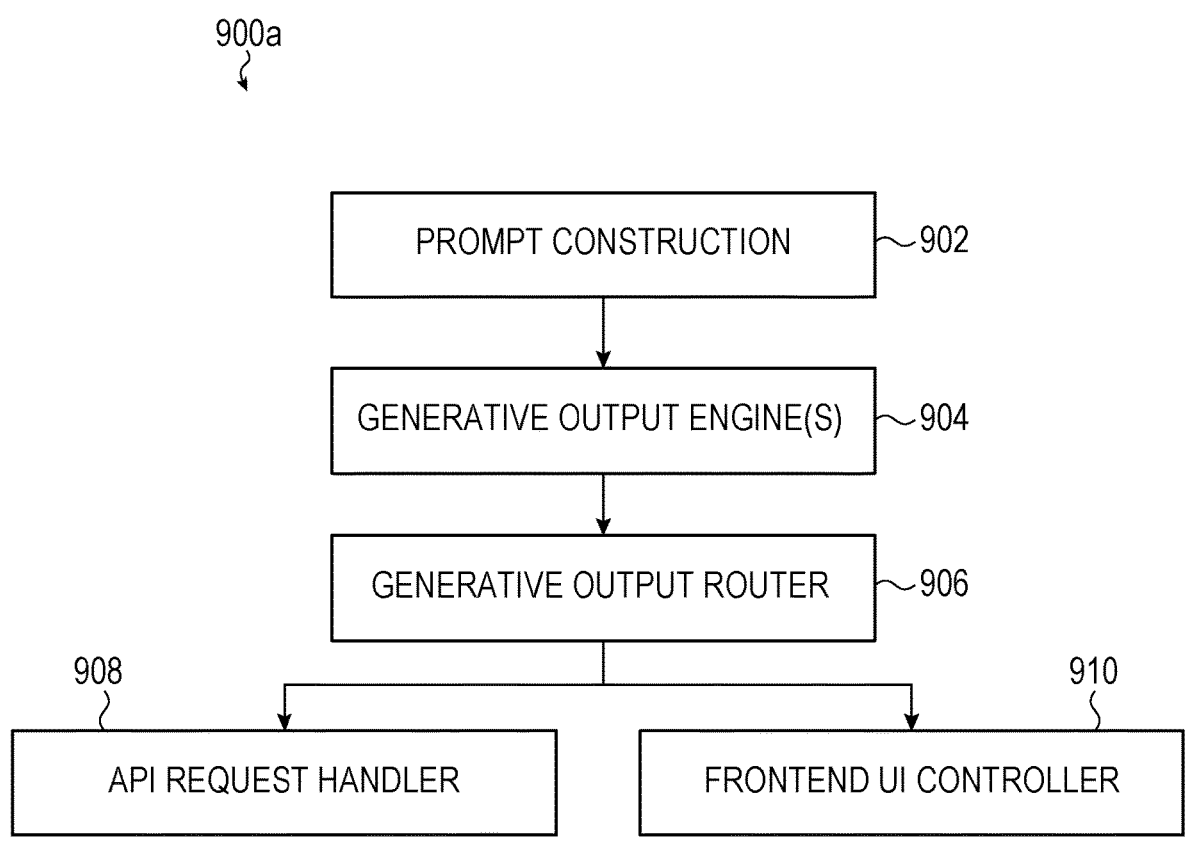
FIG. 9A depicts a simplified system diagram and data processing pipeline.

For example, although many constructions are possible, FIG. 9A depicts a simplified system diagram and data processing pipeline as described herein. The system 900*a* receives user input, and constructs a prompt therefrom at operation 902. After constructing a suitable prompt, and populating template fields, selecting appropriate instructions and examples for an LLM to continue, the modified constructed prompt is provided as input to a generative output engine 904. A continuation from the generative output engine 904 is provided as input to a router 906 configured to classify the output of the generative output engine 904 as being directed to one or more destinations. For example, the router 906 may determine that a particular generative output is an API request that should be executed against a particular API (e.g., such as an API of a system or platform as described herein). In this example, the router 906 may direct the output to an API request handler 908. In another example, the router 906 may determine that the generative output may be suitably directed to a graphical user interface/frontend. For example, a generative output may include suggestions to be shown to a user below a user's partial input, for example for an input as shown in FIGS. 2A-5.

Figure 9B:
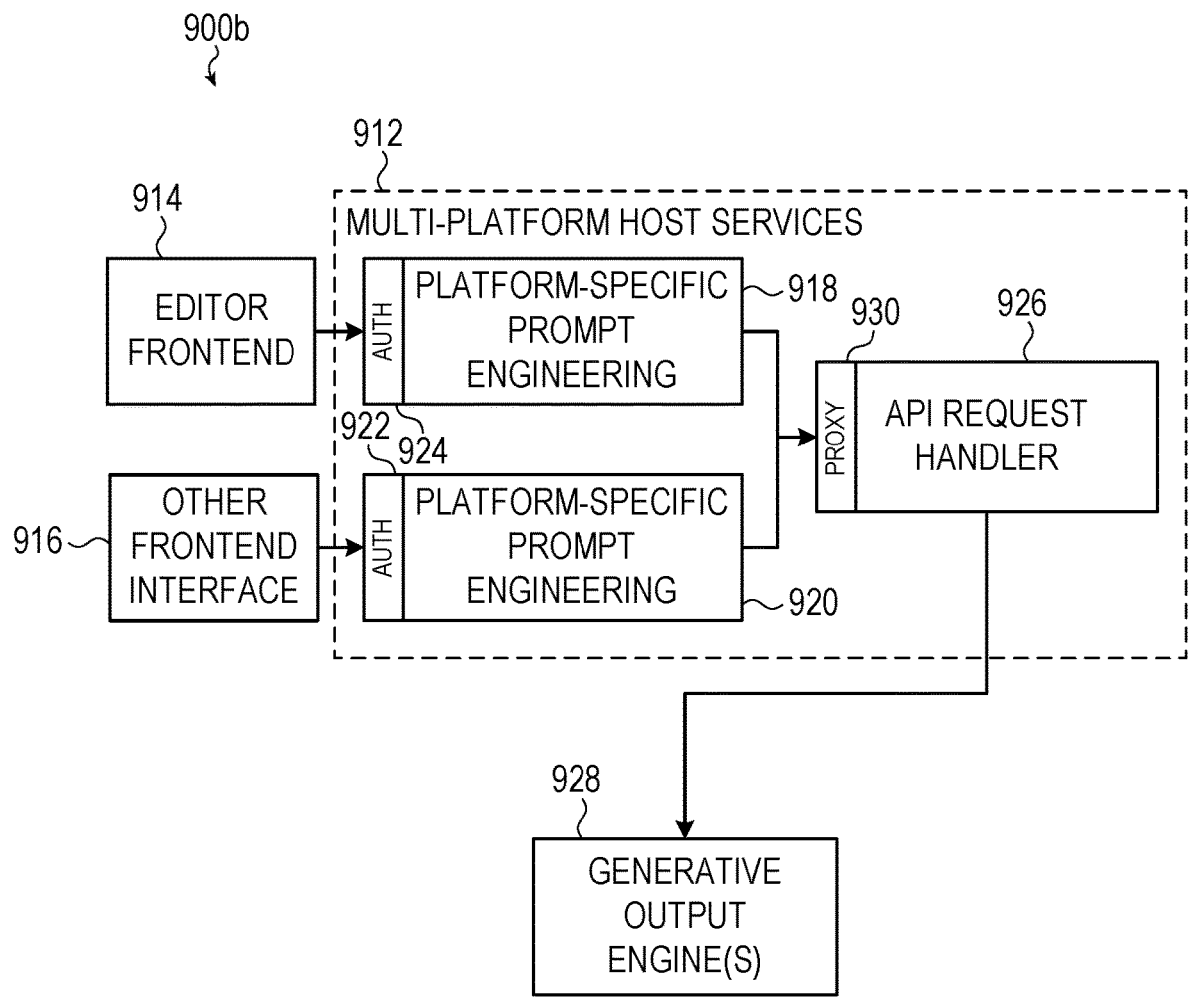
FIG. 9B depicts a system providing multiplatform prompt management as a service.

Another example architecture is shown in FIG. 9B, illustrating a system providing prompt management, and in particular multiplatform prompt management as a service. The system 900*b* is instantiated over cloud resources, which may be provisioned from a pool of resources in one or more locations (e.g., datacenters). In the illustrated embodiment, the provisioned resources are identified as the multi-platform host services 912.

The multi-platform host services 912 can receive input from one or more users in a variety of ways. For example, some users may provide input via an editor region 914 of a frontend, such as described above. Other users may provide input by engaging with other user interface elements 916 unrelated to common or shared features across multiple platforms. Specifically, the second user may provide input to the multi-platform host services 912 by engaging with one or more platform-specific user interface elements. In yet further examples, one or more frontends or backends can be configured to automatically generate one or more prompts for continuation by generative output engines as described herein. More generally, in many cases, user input may not be required and prompts may be requested and/or engineered automatically.

The multi-platform host services 912 can include multiple software instances or microservices each configured to receive user inputs and/or proposed prompts and configured to provide, as output, an engineered prompt. In many cases, these instances—shown in the figure as the platform-specific prompt engineering services 918, 920—can be configured to wrap proposed prompts within engineered prompts retrieved from a database such as described above.

In many cases, the platform-specific prompt engineering services 918, 920 can be each configured to authenticate requests received from various sources. In other cases, requests from editor regions or other user interface elements of particular frontends can be first received by one or more authenticator instances, such as the authentication instances 922, 924. In other cases, a single centralized authentication service can provide authentication as a service to each request before it is forwarded to the platform-specific prompt engineering services 918, 920.

Once a prompt has been engineered/supplemented by one of the platform-specific prompt engineering services 918, 920, it may be passed to a request queue/API request handler 926 configured to generate an API request directed to a generative output engine 928 including appropriate API tokens and the engineered prompt as a portion of the body of the API request. In some cases, a service proxy 930 can interpose the platform-specific prompt engineering services 918, 920 and the request queue/API request handler 926, so as to further modify or validate prompts prior to wrapping those prompts in an API call to the generative output engine 928 by the request queue/API request handler 926 although this is not required of all embodiments.

These foregoing embodiments depicted in FIGS. 8A-8B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

More generally, it may be appreciated that a system as described herein can be used for a variety of purposes and functions to enhance functionality of collaboration tools. Detailed examples follow. Similarly, it may be appreciated that systems as described herein can be configured to operate in a number of ways, which may be implementation specific.

For example, it may be appreciated that information security and privacy can be protected and secured in a number of suitable ways. For example, in some cases, a single generative output engine or system may be used by a multiplatform collaboration system as described herein. In this architecture, authentication, validation, and authorization decisions in respect of business rules regarding requests to the generative output engine can be centralized, ensuring auditable control over input to a generative output engine or service and auditable control over output from the generative output engine. In some constructions, authentication to the generative output engine's services may be checked multiple times, by multiple services or service proxies. In some cases, a generative output engine can be configured to leverage different training data in response to differently-authenticated requests. In other cases, unauthorized requests for information or generative output may be denied before the request is forwarded to a generative output engine, thereby protecting tenant-owned information within a secure internal system. It may be appreciated that many constructions are possible.

Additionally, some generative output engines can be configured to discard input and output one a request has been serviced, thereby retaining zero data. Such constructions may be useful to generate output in respect of confidential or otherwise sensitive information. In other cases, such a configuration can enable multi-tenant use of the same generative output engine or service, without risking that prior requests by one tenant inform future training that in turn informs a generative output provided to a second tenant. Broadly, some generative output engines and systems can retain data and leverage that data for training and functionality improvement purposes, whereas other systems can be configured for zero data retention.

In some cases, requests may be limited in frequency, total number, or in scope of information requestable within a threshold period of time. These limitations (which may be applied on the user level, role level, tenant level, product level, and so on) can prevent monopolization of a generative output engine (especially when accessed in a centralized manner) by a single requester. Many constructions are possible.

Figure 10:
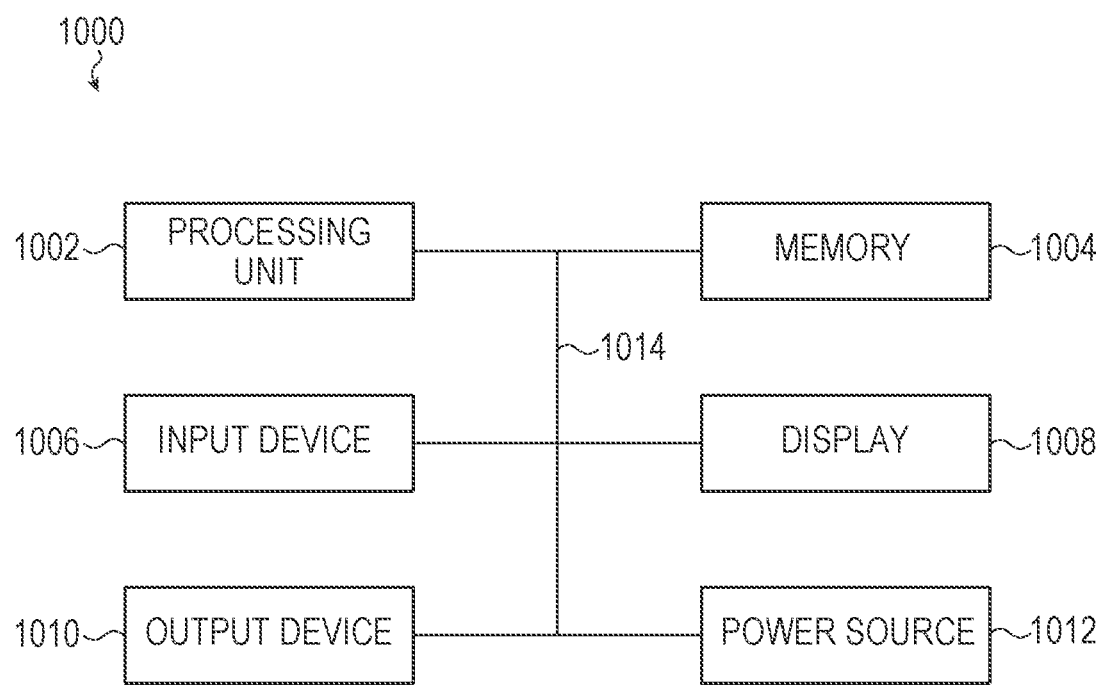
FIG. 10 shows a sample electrical block diagram of an electronic device that may perform the operations described herein.

FIG. 10 shows a sample electrical block diagram of an electronic device 1000 that may perform the operations described herein. The electronic device 1000 may in some cases take the form of any of the electronic devices described with reference to FIGS. 1-9, including client devices, and/or servers or other computing devices associated with the system 100. The electronic device 1000 can include one or more of a processing unit 1002, a memory 1004 or storage device, input devices 1006, a display 1008, output devices 1010, and a power source 1012. In some cases, various implementations of the electronic device 1000 may lack some or all of these components and/or include additional or alternative components.

The processing unit 1002 can control some or all of the operations of the electronic device 1000. The processing unit 1002 can communicate, either directly or indirectly, with some or all of the components of the electronic device 1000. For example, a system bus or other communication mechanism 1014 can provide communication between the processing unit 1002, the power source 1012, the memory 1004, the input device(s) 1006, and the output device(s) 1010.

The processing unit 1002 can be implemented as any electronic device capable of processing, receiving, or transmitting data or instructions. For example, the processing unit 1002 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1000 can be controlled by multiple processing units. For example, select components of the electronic device 1000 (e.g., an input device 1006) may be controlled by a first processing unit and other components of the electronic device 1000 (e.g., the display 1008) may be controlled by a second processing unit, where the first and second processing units may or may not be in communication with each other.

The power source 1012 can be implemented with any device capable of providing energy to the electronic device 1000. For example, the power source 1012 may be one or more batteries or rechargeable batteries. Additionally, or alternatively, the power source 1012 can be a power connector or power cord that connects the electronic device 1000 to another power source, such as a wall outlet.

The memory 1004 can store electronic data that can be used by the electronic device 1000. For example, the memory 1004 can store electronic data or content such as, for example, audio and video files, documents and applications, device settings and user preferences, timing signals, control signals, and data structures or databases. The memory 1004 can be configured as any type of memory. By way of example only, the memory 1004 can be implemented as random access memory, read-only memory, flash memory, removable memory, other types of storage elements, or combinations of such devices.

In various embodiments, the display 1008 provides a graphical output, for example associated with an operating system, user interface, and/or applications of the electronic device 1000 (e.g., a chat user interface, an issue-tracking user interface, an issue-discovery user interface, etc.). In one embodiment, the display 1008 includes one or more sensors and is configured as a touch-sensitive (e.g., single-touch, multi-touch) and/or force-sensitive display to receive inputs from a user. For example, the display 1008 may be integrated with a touch sensor (e.g., a capacitive touch sensor) and/or a force sensor to provide a touch- and/or force-sensitive display. The display 1008 is operably coupled to the processing unit 1002 of the electronic device 1000.

The display 1008 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 1008 is positioned beneath and viewable through a cover that forms at least a portion of an enclosure of the electronic device 1000.

In various embodiments, the input devices 1006 may include any suitable components for detecting inputs. Examples of input devices 1006 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1006 may be configured to detect one or more particular types of input and provide a signal (e.g., an input signal) corresponding to the detected input. The signal may be provided, for example, to the processing unit 1002.

As discussed above, in some cases, the input device(s) 1006 include a touch sensor (e.g., a capacitive touch sensor) integrated with the display 1008 to provide a touch-sensitive display. Similarly, in some cases, the input device(s) 1006 include a force sensor (e.g., a capacitive force sensor) integrated with the display 1008 to provide a force-sensitive display.

The output devices 1010 may include any suitable components for providing outputs. Examples of output devices 1010 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device of the output devices 1010 may be configured to receive one or more signals (e.g., an output signal provided by the processing unit 1002) and provide an output corresponding to the signal.

In some cases, input devices 1006 and output devices 1010 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1002 may be operably coupled to the input devices 1006 and the output devices 1010. The processing unit 1002 may be adapted to exchange signals with the input devices 1006 and the output devices 1010. For example, the processing unit 1002 may receive an input signal from an input device 1006 that corresponds to an input detected by the input device 1006. The processing unit 1002 may interpret the received input signal to determine whether to provide and/or change one or more outputs in response to the input signal. The processing unit 1002 may then send an output signal to one or more of the output devices 1010, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. The various functions and operations of a system, such as described herein, can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A computer-implemented method for collaboration content generation within a content collaboration system, the method comprising:
    receiving a notification that a video conference session has concluded at a video conferencing platform;
    in response to receiving the notification:
        providing, to the video conferencing platform using a first application program interface call, a request for a transcript of the video conference session; and obtaining the transcript from the video conferencing platform, the transcript including natural language text generated from audio of the video conference session; and in response to receiving the notification and the transcript:

generating a transcript-processing prompt comprising at least a portion of the natural language text of the transcript and an indication of an output format for a generative response;

providing, to a generative output engine using a second application program interface call, the transcript-processing prompt;

obtaining the generative response from the generative output engine responsive to the second application program interface call, the generative response including a natural language string according to the output format; and causing, within a platform of the content collaboration system, generation or modification of a collaboration content object of the platform that includes at least a portion of the generative response.

2. The computer-implemented method of claim 1, further comprising:

in response to receiving the notification and the transcript:

processing the generative response to determine that one or more portions of the generative response are mappable to one or more references of the platform of the content collaboration system; and replacing each portion of the one or more portions of the natural language string with a respective reference of the one or more references, wherein the one or more references comprise a person name, a team name, a page, a ticket, a board, or a card of the content collaboration system.

3. The computer-implemented method of claim 2, further comprising:

in response to receiving the notification:

selecting, based at least in part on a meeting type for the video conference session, a first transcript-processing prompt template from a plurality of transcript-processing prompt templates, each transcript-processing prompt template associated with one of a plurality of meeting types; and generating the transcript-processing prompt according to the first transcript-processing prompt template.

4. The computer-implemented method of claim 3, further comprising:

causing generation of a graphical user interface of the content collaboration system, the graphical user interface including one or more user inputs to accept a user indication of the output format for the generative response, wherein the output format comprises one or more information presentation types, the one or more information presentation types for the transcript including one or more of a list of key points, a list of action items, a summary page, or a summary paragraph.

5. The computer-implemented method of claim 2, wherein processing the generative response further comprises:

determining a set of names associated with a collaboration space for the video conference session, the set of names including one or more of the person name or the team name, wherein the one or more references comprise the set of names associated with the collaboration space.

6. The computer-implemented method of claim 2, wherein processing the generative response further comprises:

identifying that a portion of the natural language string is a name reference that is mappable to a plurality of name references, wherein the name reference is the person name or the team name; and selecting one name from the plurality of name references based at least in part on a context of the video conference session.

7. The computer-implemented method of claim 6, wherein the context of the video conference session comprises one or more of an individual participant, a team participant, a type of meeting, or a past meeting participation.

8. The computer-implemented method of claim 1, further comprising:

generating, wherein the transcript-processing prompt comprises a first transcript-processing prompt and the generative response comprises a first generative response, the transcript-processing prompt by splitting the natural language text of the transcript into a plurality of portions, wherein the at least a portion of the natural language text of the transcript comprises a first portion of the plurality of portions; and in response to obtaining the first generative response:

generating a second transcript-processing prompt comprising the first generative response and a second portion of the plurality of portions;

providing, to the generative output engine using a third application program interface call, the second transcript-processing prompt;

obtaining a second generative response from the generative output engine responsive to the third application program interface call; and combining at least the first generative response and the second generative response to generate the collaboration content object.

9. The computer-implemented method of claim 8, wherein the first generative response comprises a first summary of the first portion of the natural language text, and the second generative response comprises a second summary of the second portion of the natural language text.

10. The computer-implemented method of claim 1, further comprising:

identifying an existing content object of the content collaboration system that is referred to in the transcript; and causing generation of a link to the existing content object within the collaboration content object that includes at least the portion of the generative response.

11. The computer-implemented method of claim 1, further comprising:

identifying an existing content object of the content collaboration system that is referred to in the transcript; and inserting at least a portion of content of the existing content object into the collaboration content object that includes at least the portion of the generative response.

12. The computer-implemented method of claim 1, wherein:

causing modification of the collaboration content object comprises modifying one or more parameters of a task of an issue tracking platform or a documentation platform.

13. The computer-implemented method of claim 1, wherein:

the collaboration content object that is generated is a draft collaboration content object; and the method further comprises:
  causing generation of a graphical user interface of the content collaboration system, the graphical user interface providing a user input field for modification or confirmation of the draft collaboration content object.

14. A content collaboration system, comprising:
  a first interface configured to communicate with a video conferencing platform;
  a second interface configured to communicate with a generative output engine; and
  a transcript processing service coupled with the first interface and the second interface, the transcript processing service configured to:
    receive, via the first interface, a notification that a video conference session has concluded at the video conferencing platform;
    provide, to the video conferencing platform via the first interface and responsive to receiving the notification to the video conferencing platform, a first application program interface call that indicates a request for a transcript of the video conference session;
    obtain, via the first interface and responsive to the first application program interface call, the transcript from the video conferencing platform, the transcript including natural language text generated from audio of the video conference session; and
    provide, to the generative output engine via the second interface and using a second application program interface call, a transcript-processing prompt comprising at least a portion of the natural language text of the transcript;
    obtain, via the second interface and responsive to the second application program interface call, a generative response including a natural language string; and
    cause generation or modification of a collaboration content object for a platform of the content collaboration system, the collaboration content object including at least a portion of the generative response.

15. The content collaboration system of claim 14, wherein:
  the transcript-processing prompt comprises at least a portion of the natural language text of the transcript and an indication of an output format for the generative response.

16. The content collaboration system of claim 14, further comprising:
  a third interface configured to communicate with at least one client device,
  wherein the transcript processing service is further configured to cause, via the third interface, generation of a graphical user interface of the content collaboration system at the at least one client device, the graphical user interface including one or more user inputs to accept a user indication of an output format for the generative response.

17. The content collaboration system of claim 15, wherein the output format comprises one or more information presentation types, the one or more information presentation types for the transcript including one or more of a list of key points, a list of action items, a summary page, or a summary paragraph.

18. The content collaboration system of claim 14, wherein:
  causing modification of the collaboration content object comprises modifying one or more tasks of an issue tracking platform of the content collaboration system, or one or more pages of a documentation platform of the content collaboration system.

19. The content collaboration system of claim 14, wherein:
  causing modification of the collaboration content object comprises updating a calendar item for the video conference session to include one or more portions of the generative response.

20. A computer-implemented method for collaboration content generation within a content collaboration system, the method comprising:
  receiving a notification that a video conference session has concluded at a video conferencing platform;
  in response to receiving the notification:
    providing, to the video conferencing platform using a first application program interface call, a request for a transcript of the video conference session; and
    obtaining the transcript from the video conferencing platform, the transcript including natural language text for the video conference session;
  causing generation of a graphical user interface of the content collaboration system, the graphical user interface including one or more user inputs to accept a user indication of an output format for a generative response for the transcript, wherein the output format comprises one or more information presentation types, including one or more of a list of key points, a list of action items, a summary page, or a summary paragraph;
  in response to receiving the notification, the transcript, and the user indication of the output format:
    selecting, based at least in part on a meeting type for the video conference session, a first transcript-processing prompt template from a plurality of transcript-processing prompt templates, each transcript-processing prompt template associated with one of a plurality of meeting types;
    generating, according to the first transcript-processing prompt template, a transcript-processing prompt comprising at least a portion of the natural language text of the transcript and the user indication of the output format;
    providing, to a generative output engine using a second application program interface call, the transcript-processing prompt;
    obtaining the generative response from the generative output engine responsive to the second application program interface call, the generative response including a natural language string according to the output format and associated with a platform of the content collaboration system;
  in response to receiving the generative response:
    processing the generative response to determine that one or more portions of the natural language string are mappable to one or more references of the platform; and
    replacing each portion of the one or more portions of the natural language string with a respective reference of the one or more references, wherein the one or more references comprise a person name, a team name, a page, a ticket, a board, or a card of the content collaboration system; and
  causing generation or modification of a collaboration content object of the platform that includes the natural language string.

* * * * *